United States Patent
Karikari et al.

(10) Patent No.: US 9,845,408 B2
(45) Date of Patent: *Dec. 19, 2017

(54) COATING COMPOSITIONS HAVING CHELANT FUNCTIONALITY

(71) Applicant: Rohm and Haas Company, Philadelphia, PA (US)

(72) Inventors: Afia Sarpong Karikari, Bristol, PA (US); Theodore Tysak, Ambler, PA (US)

(73) Assignee: Rohm and Haas Company, Philadelphia, PA (US)

(*) Notice: Subject to any disclaimer, the term of this patent is extended or adjusted under 35 U.S.C. 154(b) by 362 days.

This patent is subject to a terminal disclaimer.

(21) Appl. No.: 14/376,474

(22) PCT Filed: Feb. 22, 2013

(86) PCT No.: PCT/US2013/027379
§ 371 (c)(1),
(2) Date: Aug. 4, 2014

(87) PCT Pub. No.: WO2013/130357
PCT Pub. Date: Sep. 6, 2013

(65) Prior Publication Data
US 2015/0025177 A1 Jan. 22, 2015

Related U.S. Application Data

(60) Provisional application No. 61/604,208, filed on Feb. 28, 2012.

(51) Int. Cl.
C09D 133/14 (2006.01)
C09D 133/02 (2006.01)
(Continued)

(52) U.S. Cl.
CPC ............ C09D 163/00 (2013.01); C08K 5/06 (2013.01); C08K 5/11 (2013.01); C08K 5/521 (2013.01);
(Continued)

(58) Field of Classification Search
CPC .......... C08F 16/28; C08F 20/34; C08F 20/52; C08F 20/70; C08F 22/22; C08F 22/36;
(Continued)

(56) References Cited

U.S. PATENT DOCUMENTS 3,331,773 A  7/1967 Gunderson et al.
5,426,142 A  6/1995 Rosano et al.
(Continued)

FOREIGN PATENT DOCUMENTS

JP  1989196721 A  8/1989
JP  1989245422 A  9/1989
(Continued)

OTHER PUBLICATIONS

Office Action from corresponding Japanese 2014-558879 application, dated Feb. 17, 2017.

*Primary Examiner* — Randy Gulakowski
*Assistant Examiner* — Ha S Nguyen
(74) *Attorney, Agent, or Firm* — Raef M. Shaltout; Thomas S. Deibert

(57) ABSTRACT

The present invention provides a floor coating composition comprising (A) and aqueous solvent; and (B) a chelating polymer which comprises units derived from one or more aminocarboxylate compounds or their salts, one or more other polymerizable monomers, one or more ethylenically unsaturated monomers and, optionally, one or more crosslinking monomers. For example, the aminocarboxylate compounds or their salts may be one or more of iminodiacetic acid (IDA), iminodisuccinic acid (IDS), ethylenediamine
(Continued)

triacetic acid (ED3A) and ethylenediamine disuccinic acid (EDDS), or their salts. Suitable polymerizable monomers may be one or more of glycidyl methacrylate (GMA), allyl glycidyl ether (AGE), vinylbenzyl chloride (VBC), allyl bromide, and their derivatives.

10 Claims, 4 Drawing Sheets

(51) Int. Cl.
    *C09D 133/04*     (2006.01)
    *C09D 163/00*     (2006.01)
    *C08L 33/02*     (2006.01)
    *C08L 33/04*     (2006.01)
    *C08L 33/14*     (2006.01)
    *C08L 63/00*     (2006.01)
    *C09G 1/04*     (2006.01)
    *C09G 1/16*     (2006.01)
    *C08K 5/06*     (2006.01)
    *C08K 5/11*     (2006.01)
    *C08K 5/521*     (2006.01)

(52) U.S. Cl.
    CPC ............. *C09D 133/14* (2013.01); *C09G 1/04* (2013.01); *C09G 1/16* (2013.01)

(58) Field of Classification Search
    CPC .......... C08F 22/40; C08L 77/00; C08L 31/02; C08L 33/24; D08K 5/06; D08K 5/10; D08K 5/17; D08K 5/175; D08K 5/20
    See application file for complete search history.

(56) References Cited

U.S. PATENT DOCUMENTS

| | | |
|---|---|---|
| 5,514,732 A | 5/1996 | Vanderlaan et al. |
| 5,548,049 A | 8/1996 | Brehm et al. |
| 5,574,090 A | 11/1996 | Gray et al. |
| 6,586,516 B1 | 7/2003 | Kesselmayer et al. |
| 8,106,149 B2 | 1/2012 | Yoneda |
| 2004/0026918 A1 | 2/2004 | Piana |
| 2007/0208129 A1* | 9/2007 | Finegan ................ C08F 220/18 524/497 |
| 2007/0254108 A1 | 11/2007 | Schopke et al. |
| 2008/0262192 A1 | 10/2008 | Yoneda |
| 2013/0109823 A1 | 5/2013 | Backer et al. |

FOREIGN PATENT DOCUMENTS

| | | | |
|---|---|---|---|
| JP | 1997111180 A | | 4/1997 |
| JP | 2005068246 A | * | 3/2005 |
| JP | 2007248863 A | | 9/2007 |
| WO | 2004026918 A1 | | 4/2004 |
| WO | 2013/066931 A1 | | 5/2013 |
| WO | 2013/066934 A1 | | 5/2013 |

* cited by examiner

COATING COMPOSITIONS HAVING CHELANT FUNCTIONALITY

CROSS REFERENCE TO RELATED APPLICATIONS

This application is a 35 USC §371 national phase filing of PCT/US2013/027379 filed Feb. 22, 2013, which claims the benefit of U.S. Application No. 61/604,208, filed Feb. 28, 2012.

FIELD OF THE INVENTION

The present invention relates to a composition for use as a floor coating having good scratch and abrasion resistance, as well as easy removability, and which comprises an aqueous solvent and a chelating polymer which comprises units derived from one or more aminocarboxylate compounds or their salts, and one or more other monomers

BACKGROUND OF THE INVENTION

Floor coating compositions (e.g., polishes) are applied to flooring substrates, such as vinyl, tile or wood, to maintain a clean and sanitary appearance. They are generally intended to be sacrificial coatings which form a film that protects the underlying flooring substrate by sacrificially accepting and resisting marks, soils, scuffs, abrasion, and scratches encountered during normal use of the substrate. During its service life, the protective films must withstand rigorous maintenance practices such as aqueous detergent scrubbings and abrasive mechanical abrasion to remove, when possible, the soils, scuffs and scratches accumulated with time. When the useful or aesthetic life of the protective film has expired, it is removed from the substrate and replaced with a new coating composition. Thus, easy removability is just as important as the coating's ability to resist marks, soil, scratches, and detergents.

Past technology employed transition metal cross-linking, such as with zinc, to strike a balance between detergent resistance and removability, while maintaining the durability of the coating composition. More recently, heightened concerns regarding environmental safety have made use of zinc cross-linking technology in floor polish compositions less acceptable. Zinc can be toxic to aquatic life in streams, rivers, and lakes. Municipal sewer facilities have threshold limits on the level of zinc that enters their facilities in the waste water. Although the floor-finish industry's contribution to total zinc input may be relatively small, it remains a focus of the municipal sewer authorities. Many United States municipalities and school districts, as well as the United States Green Building Council, have begun to require the use of zinc free finishes in their custodial cleaning products and service contracts.

Zinc-free floor polish compositions developed to date tended to fall short of the expected performance characteristics by either not providing sufficient resistance to repel scuffs, soils, and scratches, or by failing to provide acceptable resistance to the detergents and mechanical rubbing employed to restore the coatings. For example, see U.S. Patent Application Publication No. 2007/0254108 which discloses floor coating compositions using calcium instead of zinc but which fail to meet industry requirements. Also, see U.S. Pat. No. 6,586,516 which discloses aqueous coating compositions comprising acetoacetate functional polymers and a divalent metal ion which may be zinc, but which is preferrably an alkaline earth metal ion, such as calcium, magnesium, or mixtures thereof. The compositions of U.S. Pat. No. 6,586,516 provide surface coatings having scuff mark resistance mar resistance and impact resistance for a variety of substrates. End-use customers would strongly prefer zinc free floor polishes that provide the performance that has come to be expected from current zinc-containing state-of-the-art floor finishes, including resistance to scuffing, marring, marking, soiling, etc. and also providing favorable removability properties.

The problem encountered when multivalent metals other than zinc, such as calcium or magnesium, are used to achieve crosslinking in floor coating compositions is that higher levels of such other metals must be used, while concurrent coating stability becomes difficult to maintain. It is also desired to incorporate other metals such as aluminum, zirconium and titanium which normally cannot be done using traditional complexing monomers (e.g., acrylic acid, methacrylic acid, itaconic acid).

Other solutions have been attempted as well. For instance, U.S. Pat. No. 5,574,090 describes an alternative to metal crosslinking in aqueous coatings systems in which a coating composition comprises a combination of a swellable polymer with a polymer which contains functionality that will interact with the swellant to facilitate stripping and removal of the coating at the end of its useful life. This patent further teaches that acid-functional polymers may be used with amine swellants and amine functional polymers may be used with acid swellants. U.S. Pat. No. 5,574,090 teaches that most preferred are polymers that contain carboxylic acid functional groups as the swellable polymers, in combination with amines such as ammonia and lower alkyl, or lower alkanol amines.

U.S. Pat. No. 5,426,142 teaches film-forming polymers which contain acetoacetate functionality and are further reacted with amino functional silane to produce self-crosslinking, ambient curing, film-forming polymers suitable for various uses including coatings and sealants for wood, glass and concrete.

More recently, it has been recognized that acrylic polymers having chelating functionality are useful for binding metal ions in various applications. For instance, U.S. Pat. No. 3,331,773 teaches preparation of water soluble polymers having chelating functionality which are useful as water treatment agents for inhibiting calcium and magnesium scale formation. These polymers are formed by grafting water soluble chelating monomers onto water soluble polymers having aliphatic polymeric backbones. Diethylenetriamine, ethylenediamine tetraacetic acid (EDTA), and other polyalkylene polyamine polyacetic acids are identified in U.S. Pat. No. 3,331,773 as examples suitable chelating monomers.

Additionally, U.S. Pat. No. 5,514,732 also describes contact lenses made from water insoluble polymers having chelating functionality. The polymers are made from aminopolycarboxylic acids with a polymerizable olefinic group, as well as a hydrophilic monomer and one or more crosslinking monomers.

U.S. Patent Application No. 2008/00262192 describes water-soluble polymers having a high chelating performance and clay dispersancy that are suitable for use as detergents, water treatment agents and dispersants. These polymers are made by polymerizing an amino group-containing allyl monomer derived from adding an amine compound, such as iminodiacetic acid (IDA), to an allyl monomer, such as allyl glycidal ether (AGE), with other polymerizable monomers including, without limitation, unsaturated monocarboxylic acid monomers.

Most recently, vinyl aminocarboxylate monomers have been found useful for providing amine-based chelating functionality. Vinyl aminocarboxylate monomers are an entire class of polymerizable acrylic monomers having amine-based chelating functionality and which are polymerizable along with ethylenically unsaturated monomers typically used to produce various types of acrylic monomers. This is related to the technology described in the aforementioned U.S. Patent Application No. 2008/00262192 where an AGE-IDA vinyl aminocarboxylate monomer is described and incorporated into carboxylic acid-based copolymers. Polymers comprising polymerized units derived from such vinyl aminocarboxylate monomers have been identified as effective chelating agents and, therefore, are expected to be useful in various possible applications. The present invention addresses the need for zinc-free floor coating compositions that provide excellent resistance to marks, soil, scratches, scuffs and detergents, while also providing superior removability characteristics for facilitating stripping at the end of the useful life of the coating. These floor coating compositions contain polymers having amine-based chelating functionality and are capable of binding metals at high loading levels to serve as an alternative to zinc-based crosslinking schemes for curing protective films.

SUMMARY OF THE INVENTION

The present invention provides a floor coating composition comprising: (A) an aqueous solvent; and (B) a chelating polymer. The chelating polymer comprises polymerized units derived from: (1) one or more aminocarboxylic acid compounds or their salts; (2) one or more polymerizable monomers comprising a vinyl group, an allyl group, or both, and optionally, an epoxy group; and (3) one or more ethylenically unsaturated monomers.

The polymerized units derived from (B)(1) one or more aminocarboxylic acid compounds or their salts comprise those having aminocarboxylic groups of at least one of the following structures:

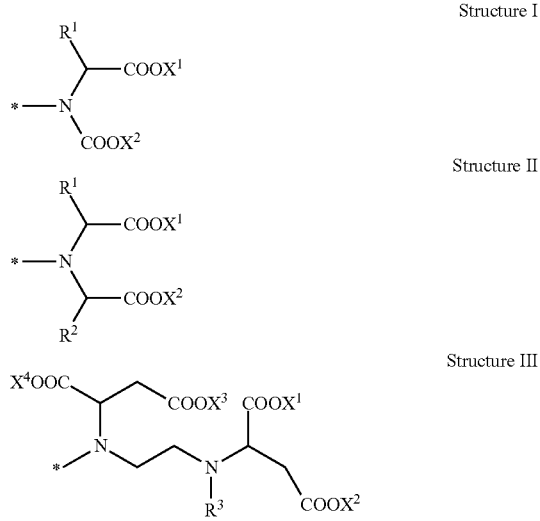

wherein $R^1$ and $R^2$ are each, independently, hydrogen, $COOX^3$ or $COOX^4$;
$X^1$, $X^2$, $X^3$ and $X^4$ are each, independently, hydrogen or a mono- or polyvalent cation;
$R^3$ is hydrogen or a unit derived from a polymerizable monomer; and
* is the location at which the aminocarboxylic group is bound to the chelating polymer at a unit derived from a polymerizable monomer, or at a unit derived from an ethylenically unsaturated monomer.

In some embodiments, the (B)(1) one or more aminocarboxylic acid compounds or their salts may be selected from the group consisting of: iminodiacetic acid (IDA), iminodisuccinic acid (IDS), ethylenediamine triacetic acid (ED3A), ethylenediamine disuccinic acid (EDDS), and their salts.

Furthermore, in some embodiments, the (B)(2) one or more polymerizable monomers may be selected from the group consisting of: glycidyl methacrylate (GMA), allyl glycidyl ether (AGE), vinylbenzyl chloride (VBC), allyl bromide, and their derivatives.

Some embodiments of the floor coating composition comprise units derived from (B)(3) one or more ethylenically unsaturated monomers which are selected from the group consisting of: carboxylic acids, esters of carboxylic acids, maleic acids, styrenes, sulfonic acids, and combinations thereof.

In some embodiments, for example, the floor coating composition comprises: (A) from 1% to 95%, by weight, of the aqueous solvent, and (B) from 5% to 80%, by weight, of the chelating polymer, based on the total weight of the floor coating composition.

Furthermore, in some embodiments of the floor polish composition of the present invention, the (B) chelating polymer further comprises units derived from one or more crosslinking monomers. The crosslinking monomers may be selected from the group consisting of: divinylaromatic compounds; di-, tri- and tetra-(meth)acrylate esters; di-, tri- and tetra-allyl ether compounds, tri- and tetra-allyl ester compounds, allyl(meth)acrylate, and combinations thereof.

The present invention also provides a method for protecting a floor substrate having a surface which comprises applying, to the surface of the floor substrate, the floor coating composition comprising: (A) an aqueous solvent; and (B) a chelating polymer, as described above.

BRIEF DESCRIPTION OF THE DRAWINGS

A more complete understanding of the present invention will be gained from the embodiments discussed hereinafter and with reference to the accompanying drawings, in which like reference numbers indicate like features, and wherein.

DETAILED DESCRIPTION OF THE INVENTION

Figure 1:
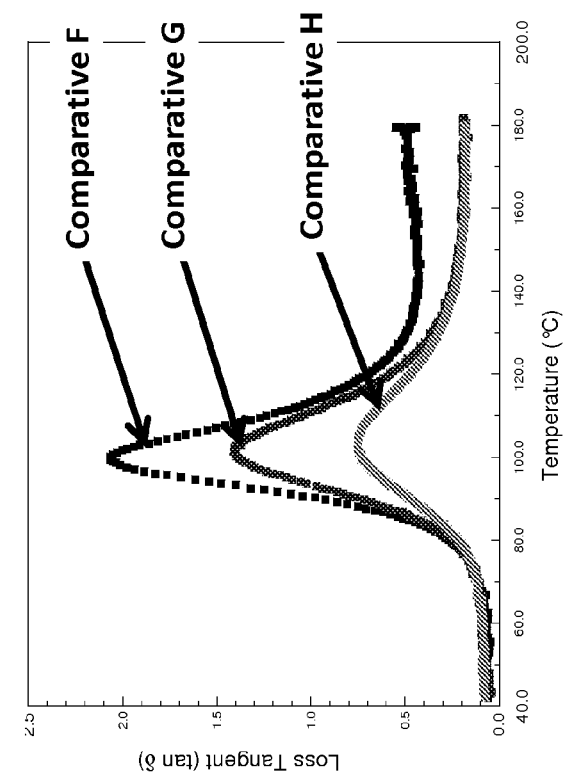
FIG. 1 is a plot of shear modulus (G') vs. temperature for Comparative Examples F, G and H.
Figure 1:
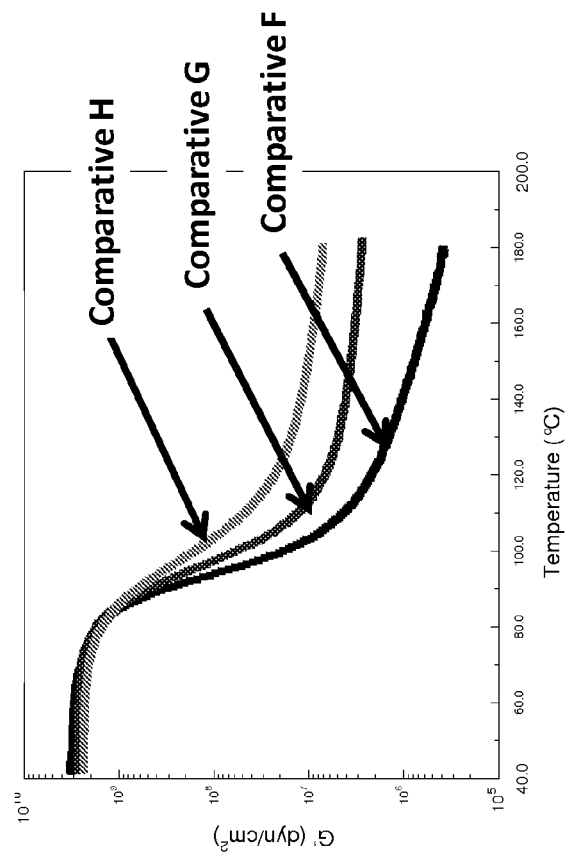

All percentages stated herein are weight percentages (wt %), unless otherwise indicated.

Temperatures are in degrees Celsius (° C.), and "ambient temperature" means between 20° C. and 25° C., unless specified otherwise.

As used herein, the term "(meth)acrylic" includes acrylic acid and methacrylic acid.

"Polymer" means a polymeric compound or "resin" prepared by polymerizing monomers, whether of the same or different types. Homopolymers are generally understood to be polymeric compounds which have been prepared from a single type of monomer. Similarly, copolymers are polymeric compounds prepared from at least two different types of monomers. For example, an acrylic acid polymer comprising polymerized units derived only from acrylic acid monomer is a homopolymer, while a polymer comprising polymerized units derived from acrylic acid, methacrylic acid and butyl acrylate is a copolymer. As used herein, the generic term "polymer" includes the terms "homopolymer," "copolymer," as well as "random" polymers and "block" polymers.

The term "polymerized units derived from" as used herein refers to polymer molecules that are synthesized according to polymerization techniques wherein a product polymer contains "polymerized units derived from" the constituent monomers which are the starting materials for the polymerization reactions. The proportions of constituent monomers, based on the total of all constituent monomers, that are used as starting materials for a polymerization reaction are assumed to result in a polymer product having the same proportions of units derived from those respective constituent monomers. For example, where 80%, by weight, of acrylic acid monomer and 20%, by weight, of methacrylic acid monomer are provided to a polymerization reaction, the resulting polymer product will comprise 80% by weight of units derived from acrylic acid and 20% by weight of units derived from methacrylic acid. This is often written in abbreviated form as 80% AA/20% MAA. Similarly, for example, where a particular polymer is said to comprise units derived from 50% by weight acrylic acid, 40% by weight methacrylic acid, and 10% by weight itaconic acid (i.e., 50% AA/40% MAA/10% IA), then the proportions of the constituent monomers provided to the polymerization reaction can be assumed to have been 50% acrylic acid, 40% methacrylic acid and 10% itaconic acid, by weight, based on the total weight of all three constituent monomers.

"Polymerizable monomers" generally means monomers or other molecule that have at least one carbon-carbon double bond and is capable of forming additional covalent bonds with other monomers or molecules of its kind, other polymerizable monomers or molecules, or polymers having polymerizable pendant groups, under normal polymerization conditions, and become incorporated in to the product polymer.

"Ethylenically unsaturated monomers" means molecules having one or more double carbon-carbon bonds, which renders them polymerizable. Monoethylenically unsaturated monomers have one carbon-carbon double bond, while multi-ethylenically unsaturated monomers have two or more carbon-carbon double bonds. As used herein, ethylenically unsaturated monomers include, without limitation, carboxylic acids, esters of carboxylic acids, maleics, styrenes and sulfonic acids. Carboxylic acid monomers include, for example, acrylic acid, methacrylic acid, and mixtures thereof. Maleic monomers include, for example, maleic acid, maleic anhydride, and substituted versions thereof. Sulfonic acid monomers include, for example, 2-(meth)acrylamido-2-methylpropanesulfonic acid, 4-styrenesulfonic acid, vinyl sulfonic acid, 2-sulfoethyl(meth)acrylic acid, 2-sulfopropyl(meth)acrylic acid, 3-sulfopropyl(meth)acrylic acid, and 4-sulfobutyl(meth)acrylic acid. Further examples of ethylenically unsaturated monomers include, without limitation, itaconic acid, crotonic acid, vinyl acetic acid, acryloxypropionic acid, methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butyl acrylamide, N-methyl acrylamide, N,N-dimethyl acrylamide; acrylonitrile, methacrylonitrile, allyl alcohol, allyl sulfonic acid, allyl phosphonic acid, vinylphosphonic acid, dimethylaminoethyl acrylate, dimethylaminoethyl methacrylate, phosphoethyl methacrylate, phosphonoethyl methacrylate (PEM), and sulfonoethyl methacrylate (SEM), N-vinyl pyrollidone, N-vinylformamide, N-vinylimidazole, ethylene glycol diacrylate, trimethylotpropane triacrylate, diallyl phthalate, vinyl acetate, styrene, 2-acrylamido-2-methyl propane sulfonic acid (AMPS) and its salts or combinations thereof.

The term "vinyl monomers" refers to monomers that contain a —CH═CH$_2$ group. Examples of vinyl monomers include, but are not limited to, vinyl acetate, vinyl formamide, vinyl acetamide, vinyl pyrrolidone, vinyl caprolactam, and long chain vinyl alkanoates such as vinyl neodecanoate, and vinyl stearate.

The term "allyl monomers" refers to monomers that contain a —CH$_2$CH═CH$_2$ group. Examples of allyl monomers include, but are not limited to, allyl glycidyl ether (AGE), phenyl glycidyl ether, vinylbenzyl chloride (VBC), and allyl bromide.

As will be recognized by persons of ordinary skill in the relevant art, attaching a chelating compound to a polymer should provide a chelating polymer having cross linking characteristics similar to that expected from the traditionally present zinc ion—MAA/AA polymer interactions. One way this has been accomplished is by grafting chelating groups, such as amines or amine derivatives, to an acrylic polymer subsequent to the polymerization reaction which produces the acrylic polymer. See, for example, U.S. Pat. No. 3,331,773. In general, chelating compounds have the ability to form stable soluble complexes with metal ions and thus prevent their precipitation.

Chelation is characterized by the equilibrium reaction between a metal ion and the functional group of the chelating compound. The most effective chelating compounds have the capacity to bind a large number of metal ions and have a greater stability associated with the formed complex.

Chelating compounds are well known and include such compounds as amino acids and their derivatives, such as ethylenediaminetetraacetic acid (EDTA) and other polyalkylenepolyaminepolyacetic acids, including polyacids of the alkylol substituents of the polyamines. Other chelating compounds have active groups consisting of carbonyl radicals, sulfonic acid radicals, amine radicals, phosphonic acid radicals, and the like.

Applicants have discovered that polymers having chelating functionality (i.e., "chelating polymers") where one or more aminocarboxylate-type chelating compounds have been incorporated directly into the polymer during polymerization actually provide improved performance when used in floor polish compositions compared to polymers having chelating compounds grafted onto them post-polymerization. This appears to be true regardless of whether the chelating polymers are formed by in situ polymerization of chelating compounds or their salts with particular polymerizable monomers and one or more ethylenically unsaturated monomers, or by first combining, by reaction, the chelating compounds with the particular polymerizable monomers to form polymerizable aminocarboxylic acid monomers or their salts, and then polymerizing these aminocarboxylic acid monomers or their salts with one or more ethylenically unsaturated monomers. The two methods of forming suitable chelating polymers for use in the floor polish compositions and method of the present invention will be described in further detail hereinafter.

In one embodiment, the present invention provides floor coating compositions which are zinc free and which have performance properties, such as cross-linking, gloss, and scratch resistance, which are comparable to, or better than, those of zinc-containing floor coating compositions. More particularly, the floor coating compositions of the present invention comprise: (A) an aqueous solvent; and (B) a chelating polymer comprising, as polymerized units derived from, (1) one or more aminocarboxylic acid compounds or their salts; (2) one or more polymerizable monomers comprising a vinyl group, an allyl group, or both, and, optionally, an epoxy group; and (3) one or more ethylenically unsaturated monomers.

In some embodiments, for example, the floor coating composition of the present invention will comprise from 1% to 95%, by weight, of the aqueous solvent, and from 5% to 80%, by weight, of the chelating polymer, based on the total weight of the floor coating composition.

For example, without limitation, the floor coating composition may comprise at least 3%, or at least 10%, or even at least 30%, by weight, of the aqueous solvent, based on the total weight of the floor coating composition. Furthermore, for example, the floor coating composition may comprise up to 70%, or up to 80%, or even up to 90%, by weight, of the aqueous solvent, based on the total weight of the floor coating composition.

In addition, the floor coating composition may, for example, without limitation, comprise at least 10%, or at least 15%, or even at least 20%, by weight, of the chelating polymer, based on the total weight of the floor coating composition. Furthermore, for example, the floor coating composition may comprise up to 65%, or up to 70%, or even up to 75%, by weight, of the chelating polymer, based on the total weight of the floor coating composition.

The aqueous solvent comprises from 5% to 95% of water, and from 1% to 50% of one or more other solvents, by weight, based on the total weight of the aqueous solvent.

In some embodiments, for example, without limitation, the aqueous solvent may comprise at least 5%, or at least 10%, or even at least 20%, by weight, of water, based on the total weight of the aqueous solvent. Also, the aqueous solvent may, for example, comprise up to up to 50%, or up to 70%, or even up to 85%, by weight, of water, based on the total weight of the aqueous solvent.

Furthermore, in some embodiments, for example, without limitation, the aqueous solvent may comprise at least 2%, or at least 5%, or even at least 10%, by weight, of the one or more other solvents, based on the total weight of the aqueous solvent. Also for example, the aqueous solvent may comprise up to up to 20%, or up to 25%, or even up to 35%, by weight, of water, based on the total weight of the aqueous solvent.

Compounds suitable for use as the one or more other solvents may, for example, be selected from coalescing solvents, plasticizing solvents, or combinations thereof. Suitable coalescing solvents, for example, may be selected from Butoxyethyl PROPASOL™, Butyl CARBITOL™, Butyl CELLOSOLVE™ Acetate, Butyl CELLOSOLVE™, Butyl DIPROPASOL™, Butyl PROPASOL™, CARBITOL™ PM-600, CARBITOL™ Low Gravity, CELLOSOLVE™ Acetate, CELLOSOLVE™, Ester EEP™, FILMER IBT™, Hexyl CARBITOL™, Hexyl CELLOSOLVE™, Methyl CARBITOL™, Methyl CELLOSOLVE™ Acetate, Methyl CELLOSOLVE™, Methyl DIPROPASOL™, Methyl PROPASOL™ Acetate, Methyl PROPASOL™, Propyl CARBITOL™, Propyl CELLOSOLVE™, Propyl DIPROPASOL™ and Propyl PROPASOL™, among others, all of which are available from Dow Chemical Company of Midland, Mich., U.S.A.

Suitable plasticizing solvents, for example, may be selected from ethylene glycol phenyl ether (commercially available as "DOWANOL™ EPh" from Dow Chemical Company), propylene glycol phenyl ether (commercially available as "DOWANOL™ PPh" from Dow Chemical Company); 2,2,4-Trimethyl-1,3-pentanediol diisobutyrate; tributoxy ethyl phosphate; dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products commercially available under the trade designations DBE, DBE-3, DBE-4, DBE-5, DBE-6. DBE-9, DBE-IB, and DBE-ME from E.I. du Pont de Nemours and Company, of Wilmington, Del., U.S.A.); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate, among others.

In the chelating polymer, the polymerized units derived from (B)(1) one or more aminocarboxylic acid compounds or their salts comprise those having aminocarboxylic groups of at least one of the following structures:

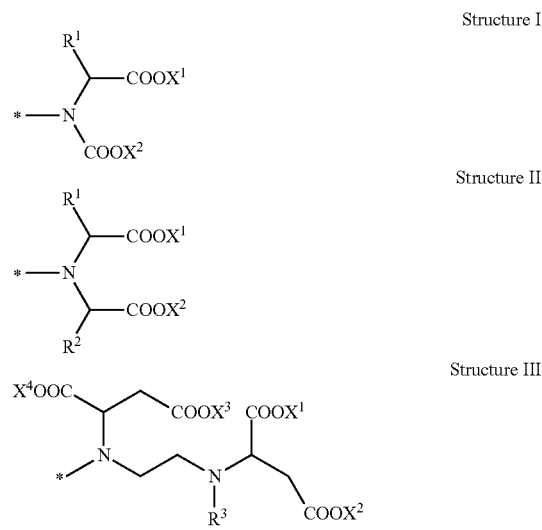

wherein $R^1$ and $R^2$ are each, independently, hydrogen, $COOX^3$ or $COOX^4$;

$X^1$, $X^2$, $X^3$ and $X^4$ are each, independently, hydrogen or a mono- or polyvalent cation;

$R^3$ is hydrogen or a unit derived from a polymerizable monomer; and

* is the location at which the aminocarboxylic group is bound to the chelating polymer at a unit derived from a polymerizable monomer, or at a unit derived from an ethylenically unsaturated monomer.

Suitable mono- or polyvalent cations include, without limitation, one or more of the following: $Na^+$, $K^+$, $NH_4^+$, $Ca^{2+}$, $Mg^{2+}$, $Ba^{2+}$, $Sr^{2+}$, $V^{2+}$, $Mn^{2+}$, $Fe^{2+}$, $Al^{3+}$, $Zr^{2+}$, $Co^{2+}$, $Cd^{2+}$, $Zn^{2+}$, $TiO^{2+}$, $Pb^{2+}$, $Y^{3+}$, $Pd^{2+}$, $Ni^{2+}$, $VO^{2+}$, $Cu^{2+}$, $Ga^{3+}$, $Ti^{3+}$, $Hg^{2+}$, $Sc^{3+}$, $Th^{4+}$, $In^{3+}$, $Fe^{3+}$, $V^{3+}$ and combinations thereof. Preferred cations are $Na^+$, $K^+$, $NH_4^+$, $Ca^{2+}$ and $Mg^{2+}$ and combinations thereof.

Aminocarboxylic acid compounds or their salts which are suitable for use as constituent monomers of the chelating polymer include, for example, without limitation, iminodiacetic acid (IDA), iminodisuccinic acid (IDS), ethylenediamine triacetic acid (ED3A), ethylenediamine disuccinic acid (EDDS), or their salts. Of course, mixtures and combinations of different kinds of aminocarboxylic acids or their salts may be suitably included as well.

These exemplary aminocarboxylic compounds have the following pre-reaction structures:

Iminodiacetic acid (IDA), or its salt, for example, has the following general structure:

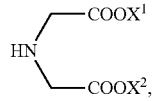

wherein $X^1$ and $X^2$ are each, independently, hydrogen or a mono- or polyvalent cation, such as those listed above.

Iminodisuccinic acid (IDS) or its salt, on the other hand, has the following general structure:

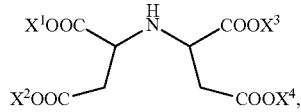

wherein $X^1$, $X^2$, $X^3$ and $X^4$ are each, independently, hydrogen or a mono- or polyvalent cation, such as those listed above.

Ethylenediamine triacetic acid (ED3A), or its salt, has the following general structure:

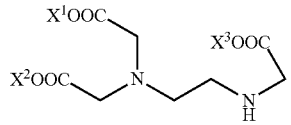

wherein $X^1$, $X^2$ and $X^3$ are each, independently, hydrogen or a mono- or polyvalent cation, such as those listed above.

Ethylenediamine disuccinic acid (EDDS), or its salt, has the following general structure:

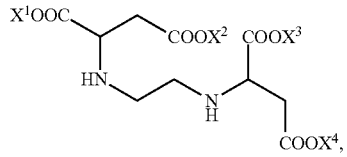

wherein $X^1$, $X^2$, $X^3$ and $X^4$ are each, independently, hydrogen or a mono- or polyvalent cation, such as those listed above.

The units of the chelating polymer which are derived from (B)(2) one or more polymerizable monomers comprise a vinyl group ($-CH=CH_2$), an allyl group ($-CH_2CH=CH_2$), or both, and, optionally, an epoxy group. These units may, for example, without limitation, have one or more of the following structures:

a)
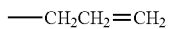

b)

c)
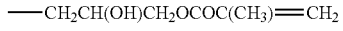

d)
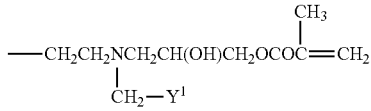

e)
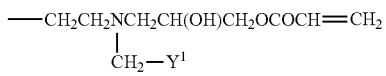

f)
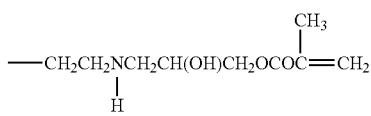

g)
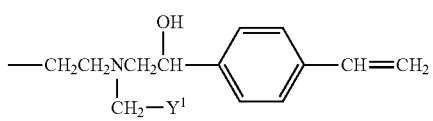

h)
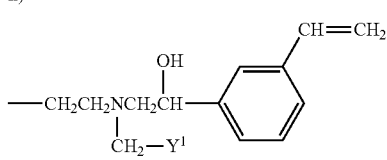

i)
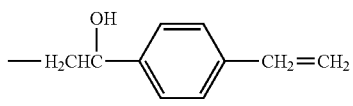

j)
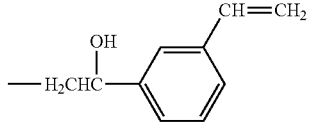

k)
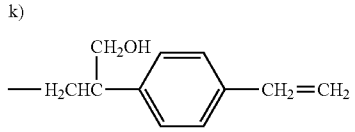

l)
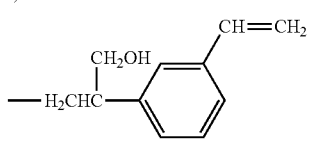

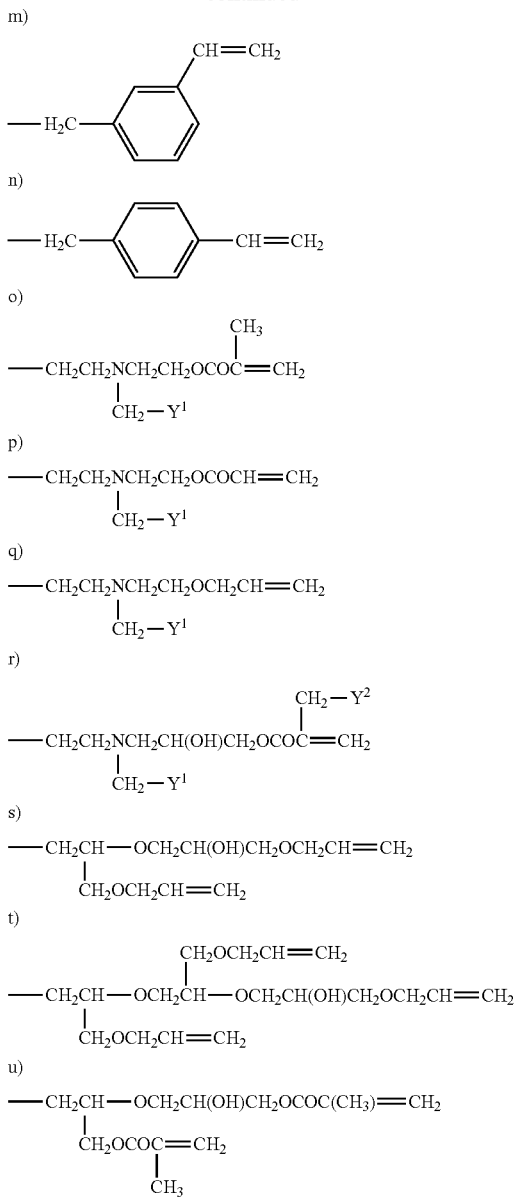

wherein, $Y^1$ and $Y^2$ are each, independently and where present, hydrogen, $COOX^5$ or $COOX^6$, and $X^5$ and $X^6$ are each, independently, hydrogen or a mono- or polyvalent cation, as defined hereinabove.

Suitable mono- or polyvalent cations include, without limitation, one or more of the following: $Na^+$, $K^+$, $NH_4^+$, $Ca^{2+}$, $Mg^{2+}$, $Ba^{2+}$, $Sr^{2+}$, $V^{2+}$, $Mn^{2+}$, $Fe^{2+}$, $Al^{3+}$, $Zr^{2+}$, $Co^{2+}$, $Cd^{2+}$, $Zn^{2+}$, $TiO^{2+}$, $Pb^{2+}$, $Y^{3+}$, $Pd^{2+}$, $Ni^{2+}$, $VO^{2+}$, $Cu^{2+}$, $Ga^{3+}$, $Ti^{3+}$, $Hg^{2+}$, $Sc^{3+}$, $Th^{4+}$, $In^{3+}$, $Fe^{3+}$, $V^{3+}$ and combinations thereof. Preferred cations are $Na^+$, $K^+$, $NH_4^+$, $Ca^{2+}$ and $Mg^{2+}$ and combinations thereof.

Additionally, as will be readily recognized by persons of ordinary skill in the art relevant art, monomers suitable for deriving these units (B)(2) of the chelating polymer include, for example, without limitation, glycidyl methacrylate (GMA), allyl glycidyl ether (AGE), vinylbenzyl chloride (VBC), and allyl bromide, and their derivatives.

Ethylenically unsaturated monomers from which the units (B)(3) of the chelating polymer are derived include, without limitation, those listed hereinabove. Preferred ethylenically unsaturated monomers include carboxylic acids, esters of carboxylic acids, maleic acids, styrenes, sulfonic acids and combinations thereof.

Particularly suitable ethylenically unsaturated monomers include, for example, those containing an acidic functional group selected from one or more of carboxylic, sulfonic and phosphonic groups. For example, suitable carboxylic acid monomers include, without limitation, monoethylenically unsaturated ($C_3$-$C_9$) carboxylic acid monomers, such as unsaturated monocarboxylic and dicarboxylic acid monomers. For example, unsaturated monocarboxylic acids include acrylic acid (AA), methacrylic acid (MAA), alpha-ethacrylic acid, beta-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and alkali and metal salts thereof.

Additional suitable monoethylenically unsaturated monomers are those containing sulfonic acid or phosphonic groups include, for example, 2-acrylamido-2-methyl-1-propane-sulfonic acid, 2-methacrylamido-2-methyl-1-propanesulfonic acid, 3-methacryl-amido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate.

As a further example, the one or more monoethylenically unsaturated monomers may comprise one or more (meth) acrylic monomers containing one or more pendant reactive functional groups selected from hydroxy, thiol, and amino groups. Suitable hydroxy-functional (meth)acrylic monomers include, for example, hydroxyl ($C_1$-$C_4$)alkyl(meth) acrylates, such as hydroxyethyl methacrylate, hydroxyethyl acrylate, hydroxypropyl methacrylate and hydroxypropyl acrylate. Suitable amino-functional (meth)acrylic monomers include, for example, dimethylaminopropyl methacrylamide, dimethylaminopropyl acrylamide, dimethylaminoethyl methacrylate, dimethylaminoethyl acrylate, dimethylaminopropyl methacrylate and dimethylaminopropyl acrylate. Suitable thiol-functional (meth)acrylic monomers include, for example, 2-mercaptopropyl methacrylate.

As a still further example, the one or more monoethylenically unsaturated monomers may comprise one or more ($C_1$-$C_{20}$)alkyl(meth)acrylate ester monomers, such as, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl(meth)acrylate, decyl(meth)acrylate, isodecyl(meth) acrylate, undecyl(meth)acrylate, dodecyl(meth)acrylate (also known as lauryl(meth)acrylate), tridecyl(meth)acrylate, tetradecyl(meth)acrylate (also known as myristyl(meth) acrylate), pentadecyl(meth)acrylate, hexadecyl(meth)acrylate (also known as cetyl(meth)acrylate), heptadecyl(meth) acrylate, octadecyl(meth)acrylate (also known as stearyl (meth)acrylate), nonadecyl(meth)acrylate, eicosyl(meth) acrylate and combinations thereof. Typically, the $(C_1-C_{20})$ alkyl(meth)acrylate esters are $(C_1-C_8)$alkyl(meth)acrylate esters and preferably $(C_1-C_8)$alkyl acrylate esters; more preferably, the $(C_1-C_{20})$alkyl(meth)acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

The one or more monoethylenically unsaturated monomers used to prepare the water insoluble polymer binders, may comprise one or more vinylaromatic monomers, such as, for example, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether.

It is also possible for the water insoluble polymer resins to comprise, as polymerized units, 0-50%, such as 0-25%, of one or more other copolymerizable monomers. Suitable other copolymerizable monomers include, for example, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, and amides of ethylenically unsaturated $(C_3-C_6)$carboxylic acids, amides of ethylenically unsaturated $(C_3-C_6)$carboxylic acids that are substituted at the nitrogen by one or two $(C_1-C_4)$alkyl groups, acrylamide, methacrylamide and N-methylol(meth)acryl-amide.

The constituent monomers, (B)(1), (B)(2) and (B)(3), from which the chelating polymer is derived may, for example, be provided individually, or in various mixtures, to the polymerization reaction process which produces the chelating polymer. This is referred to herein as the "in situ" method of preparing the chelating polymer, i.e., where all three categories of constituent monomers are supplied and polymerized together.

Alternatively, the chelating polymer may be produced by providing a polymerizable aminocarboxylic acid monomer or its salt, which is the reaction product of the (B)(1) one or more aminocarboxylaic acid compounds or their salts and the (B)(2) one or more polymerizable monomer, to the polymerization reaction, along with the (B)(3) one or more ethylenically unsaturated monomers. In other words, the one or more polymerizable monomers comprising a vinyl group, an allyl group, or both, and optionally an epoxy group are first modified by reacting with (B)(1) one or more aminocarboxylaic acid compounds or their salts, thereby forming polymerizable aminocarboxylic acid monomers or their salts. The polymerizable aminocarboxylic acid monomers or their salts are then polymerized with one or more ethylenically unsaturated monomers to produce the chelating polymers suitable for use in the floor polish compositions and method of the present application.

In some embodiments, for example, polymerizable aminocarboxylic acid monomers or their salts are prepared from a polymerizable monomer and at least one chelating compound selected from the group consisting of: iminodiacetic acid; iminodisuccinic acid; ethylenediamine triacetic acid; and ethylenediamine disuccinic acid. In such embodiments, the one or more polymerizable monomers may, for example without limitation, be glycidyl methacrylate (GMA), allyl ether (AGE), vinylbenzyl chloride (VBC) or mixtures thereof. The resulting polymerizable aminocarboxylic acid monomers or their salts are then polymerized with one or more ethylenically unsaturated monomers. Preferred ethylenically unsaturated monomers include: butyl acrylate (BA), methyl methacrylate (MMA), methacrylic acid (MAA), itaconic acid (IA), styrene (STY), and their salts and derivatives.

Furthermore, in some embodiments, the chelating polymer (B) in the floor coating composition comprises (1) from 1% to 99%, by weight of the one or more vinyl aminocarboxylic acid monomers; and (2) from 1% to 99%, by weight of the one or more ethylenically unsaturated monomers, based on the total weight of the chelating polymer (B).

In some embodiments of the floor polish composition according to the present invention, the chelating polymer may further comprise units derived from (4) one or more crosslinking monomers. Crosslinking monomers are monomers having two or more ethylenically unsaturated groups, and may include, for example, without limitation, divinylaromatic compounds, di-, tri- and tetra-(meth)acrylate esters, di-, tri- and tetra-allyl ether or ester compounds and allyl(meth)acrylate. Preferred crosslinking monomers for use in the present invention include, for example, divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Especially preferred crosslinking monomers include DVB, ALMA, EGDMA, HDDA and BGDMA. When present in some embodiments, the one or more crosslinking monomers may be bi-, tri-, or tetra-ethylenically unsaturated, or even a combination thereof.

The chelating polymer may comprise from 0.3% to 3% of units derived from one or more crosslinking monomers, by weight, based on the total weight of the chelating polymer. For example, in some embodiments, the chelating polymer may comprise at least 0.4%, or at least 0.6%, or at least 0.8%, or at least 0.9%, or even at least 1.1%, by weight, based on the total weight of the chelating polymer. Similarly, For example, in some embodiments, the chelating polymer may comprise up to 2.8%, or up to 2.5%, or up to 2.1%, or up to 1.8%, or even up to 1.5%, by weight, based on the total weight of the chelating polymer.

Copolymerizing polymerizable aminocarboxylic acid monomers or their salts with traditional ethylenically unsaturated monomers, such as butyl acrylate (BA), methyl methacrylate (MMA), methacrylic acid (MAA), itaconic acid (IA), and styrene (STY) produces unique aqueous emulsion compositions comprising chelating polymers (B) that are capable of binding metals at high loading levels and, therefore, suitable for use in zinc-free floor coating compositions which have the desired degree of resistance to marks, soil, scratches, and detergents, as well as easy removability when the coating is to be replaced with a new one.

Specifically, applicants have found that the presence of the aminocarboxylate groups from the one or more vinyl aminocarboxylic acid monomers improves the calcium binding ability of traditional floor care polymers. The polymerizable chelant monomers prepared and evaluated included vinyl aminocarboxylate monomers based on the reaction of iminodiacetic acid (IDA) or ethylenediaminetriacetic acid (ED3A) (i.e., amine compounds) with glycidyl methacrylate (GMA), allyl ether (AGE) or vinylbenzyl chloride (VBC), or their derivatives (i.e., traditional vinyl monomers).

As evidenced by the data provided in the examples hereinbelow, test results confirmed improved calcium incorporation with improved calcium cross-linking properties for chelant based copolymers compared to traditional polymer compositions which did not contain the new aminocarboxylate groups. The chelant-based polymers provided gloss performance in floor polish that is comparable to the conventional floor polishes. Additionally, the chelant polymers showed scratch resistance properties that were superior to the conventional floor polish.

The method of polymerization employed to prepare the chelating polymer useful in the floor polish composition and method of the present invention is not particularly limited and may be any method known, now or in the future, to persons of ordinary skill including, but not limited to, emulsion, solution, addition and free-radical polymerization techniques.

For example, in some embodiments, the chelating polymer may be prepared by performing free-radical polymerization reactions. Among such embodiments, some involve the use of one or more initiators. An initiator is a molecule or mixture of molecules that, under certain conditions, produces at least one free radical capable of initiating a free-radical polymerization reaction. Photoinitiators, thermal initiators, and "redox" initiators, among others, are suitable for use in connection with the present invention. Selection of particular initiators will depend on the particular monomers being polymerized with one another and is within the capability of persons of ordinary skill in the relevant art. Another category of suitable initiators is the group of persulfates, including, for example, sodium persulfate. In some embodiments one or more persulfate is used in the presence of one or more reducing agents, including, for example, metal ions (such as, for example, ferrous ion), sulfur-containing ions (such as, for example, S2O3(=), HSO3(-), SO3(=), S2O5(=), and mixtures thereof), and mixtures thereof.

Production of the polymer having chelating functionality in accordance with the present invention may also involve the use of a chain regulator. A chain regulator is a compound that acts to limit the length of a growing polymer chain. Some suitable chain regulators are, for example, sulfur compounds, such as mercaptoethanol, 2-ethylhexyl thioglycolate, thioglycolic acid, and dodecyl mercaptan. In some embodiments, the chain regulator includes sodium metabisulfite. Other suitable chain regulators include, for example without limitation, OH-containing compounds which are suitable for use in a mixture with water to form a solvent (such as isopropanol and propylene glycol).

Additionally, in some embodiments, the chelating polymer may be produced by aqueous emulsion polymerization techniques. Generally, aqueous emulsion polymerization involves monomer, initiator, and surfactant in the presence of water. The emulsion polymerization may be performed by a method that includes the steps of adding one or more monomers (which may be neat, in solution, in aqueous emulsion, or a combination thereof) to a vessel that contains, optionally with other ingredients, water.

Initiators suitable for use in emulsion polymerization processes include, for example, water soluble peroxides, such as sodium or ammonium persulfate; oxidants, such as persulfates or hydrogen peroxide, in the presence of reducing agents, such as sodium bisulfite or isoascorbic acid and/or polyvalent metal ions, to form an oxidation/reduction pair to generate free radicals at any of a wide variety of temperatures; water soluble azo initiators, including cationic azo initiators, such as 2,2'-azobis(2-methylpropionamide) dihydrochloride. Furthermore, the emulsion polymerization process may employ one or more oil-soluble initiators, including, for example, oil-soluble azo initiators.

One or more surfactants may also be employed during emulsion polymerization. For example, at least one of the surfactants may be selected from alkyl sulfates, alkylaryl sulfates, alkyl or aryl polyoxyethylene nonionic surfactants, and mixtures thereof.

The use, application and benefits of the present invention will be clarified by the following discussion and description of exemplary embodiments of the present invention.

EXAMPLES

TABLE 1

| Abbreviations | |
|---|---|
| BA | Butyl acrylate |
| AGE-IDA | Allylglycidyl ether-iminodiacetic acid chelant monomer |
| AGE-ED3A | Allylglycidyl ether-ethylenediaminetriacetic acid monomer |
| GMA-IDA | Glycidyl Methacrylate-iminodiacetic acid chelant monomer |
| VBC-IDA | Vinylbenzyl chloride-iminodiacetic acid |
| IDA | Iminodiacetic acid |
| IA | Itaconic acid |
| Ca | Calcium |
| Ca(OH)$_2$ | Calcium hydroxide |
| DVB | Divinylbenzene |
| eq. | Equivalent |
| MMA | Methyl methacrylate |
| MAA | Methacrylic acid |
| STY | Styrene |
| ED3A | Ethylenediaminetriacetic acid |
| Zn, ZnO | Zinc, Zinc Oxide |

The abbreviations used in the following examples are listed in Table 1 above and have the meaning set forth therein. Table 2 lists the materials included in the polymerization recipe and their amounts.

Example 1: 23.5 BA/30.1 MMA/34.3 STY/8.9 MAA/1.9 GMA-IDA/1.3 DVB

In a suitable reaction vessel equipped with a thermometer, condenser, and stirrer, the initial reactor charge was heated to 85-86° C. under a nitrogen blanket while Feeds A to L, described in Table 2, were being prepared. At 85° C., Feed C and rinse was added all at once to the reaction vessel and the temperature adjusted to 80-85° C. followed by the kettle charge of Feed D. Within 2 minutes, the onset of polymerization was signaled by a temperature rise of 3° to 5° C. and a change in the appearance (color and opacity) of the reaction mixture. When the exotherm ceased, the remaining monomer mixture, Feed A, and a co-feed catalyst solution Feed E were gradually added to the reaction vessel over 120 minutes at about 85° C. At the same time, Feed B was simultaneously added to the reaction vessel over 120 minutes at about 85° C. After the additions, the reactor contents were held at 85° C. for fifteen minutes. The reactor was then cooled to 60° C. and chased by adding first a shot of Feed F, followed by shots of Feeds G and H. A second chase, fifteen minutes later, consisted of gradually feeding a second redox pair, Feeds I and J over 25 minutes. After the chase, the contents of the reactor were cooled to 40° C. Feed K was added to the reactor over ten minutes. Feed L was then added over 20 minutes to the reaction vessel to adjust the latex pH to 8.2. The contents of the reactor was then passed through 100 and 325 mesh screens and characterized for solids, pH, viscosity and particle size.

TABLE 2

| Materials | Example 1 | Comparative A | Comparative F |
|---|---|---|---|
| REACTOR CHARGE | | | |
| D.I. WATER | 338.00 | 307.12 | 347.92 |
| POLYSTEP A-16-22[1] | 12.38 | 13.49 | 13.31 |
| FEED A | | | |
| D.I. WATER | 95.10 | 106.85 | 102.05 |
| POLYSTEP A-16-22[1] | 6.62 | 7.20 | 7.11 |
| BUTYL ACRYLATE | 87.59 | 89.41 | 88.22 |
| METHYL METHACRYLATE | 112.16 | 114.48 | 112.95 |
| STYRENE | 127.61 | 130.24 | 128.50 |
| GLACIAL METHACRYLIC ACID | 33.48 | 34.18 | 40.78 |
| DIVINYL BENZENE | 4.80 | 4.89 | 4.83 |
| FEED B | | | |
| DI WATER DILUTION | 12.61 | 0 | 0 |
| DISPONIL FES 77 (33%)[2] | 5.66 | 0 | 0 |
| GMA-IDA | 29.90 | 0 | 0 |
| FEED C | | | |
| MONOMER EMULSION SEED (1.39%) | 6.93 | 7.55 | 7.45 |
| D.I. WATER, rinse | 5.03 | 5.21 | 5.15 |
| FEED D | | | |
| AMMONIUM PERSULFATE, 99% | 1.64 | 1.64 | 1.62 |
| D.I. WATER | 6.26 | 7.33 | 7.24 |
| FEED E | | | |
| AMMONIUM PERSULFATE, 99% | 0.30 | 0.32 | 0.37 |
| D.I. WATER | 48.24 | 52.05 | 59.22 |
| FEED F | | | |
| IRON SULFATE HEPTAHYDRATE (0.15%) | 0.75 | 0.77 | 0.76 |
| D.I. WATER | 2.00 | 1.05 | 1.59 |
| FEED G | | | |
| t-BUTYLHYDROPEROXIDE (70%) | 0.63 | 0.65 | 0.64 |
| D.I. WATER | 6.07 | 6.26 | 6.18 |
| FEED H | | | |
| ISOASCORBIC ACID | 0.38 | 0.37 | 0.37 |
| D.I. WATER | 6.24 | 6.24 | 6.20 |
| FEED I | | | |
| t-BUTYLHYDROPEROXIDE (70%) | 0.64 | 0.65 | 0.64 |
| D.I. WATER | 6.01 | 6.25 | 6.22 |
| FEED J | | | |
| ISOASCORBIC ACID | 0.38 | 0.37 | 0.37 |
| D.I. WATER | 6.24 | 6.24 | 6.18 |
| FEED K | | | |
| THORCOWET TDA-40 (70%)[3] | 8.65 | 8.84 | 8.73 |
| D.I. WATER | 20.21 | 19.02 | 21.08 |
| FEED L | | | |
| AQUA AMMONIA (10%) | 9.01 | 15.60 | 16.59 |

[1] Commercially available from Stepan Company of Northfield, Illinois, USA.
[2] Commercially available from Cognis Corporation of Cincinnati, Ohio, USA.
[3] Commercially available from Thornley Company of Newark, Delaware, USA.

Example 2: 23.5 BA/30.1 MMA/34.3 STY/8.9 MAA/1.9 GMA-IDA/1.3 DVB, 0.27 Equivalent $Ca(OH)_2$ The styrene acrylic dispersion of Example 2 was prepared by charging 0.27 equivalents $Ca(OH)_2$ to 300 grams aliquot of the latex made in Example 1. The procedure involves preparing a slurry of 1.3 g of calcium hydroxide in 3.53 g DI water with 0.03 g of a polyacid dispersant TAMOL 945 dispersant (45%) (commercially available from The Dow Chemical Company of Midland, Mich., USA). The cross-linker slurry mixture was added to the aliquot of the latex in Example 1 over 30 mins at 40° C., and stirred for 1 h at 40° C. After 1 h, the latex was cooled and filtered using a 100 and 325 mesh screens, and the filtered polymer was equilibrated overnight. It was assessed for colloidal stability and sedimentation of the calcium.

Example 3: 23.5 BA/30.1 MMA/34.3 STY/8.9 MAA/1.9 GMA-IDA/1.3 DVB, 0.58 Equivalent $Ca(OH)_2$ The styrene acrylic dispersion of Example 3 was prepared in the same manner as Example 2 except 0.58 equivalents $Ca(OH)_2$ was charged to a 300 g aliquot of the latex made in Example 1. The calcium slurry contained 2.89 g of $Ca(OH)_2$, 6.72 g DI water and 0.04 TAMOL 945 dispersant (45%).

Example 4: 23.5 BA/30.1 MMA/34.3 STY/8.9 MAA/1.9 GMA-IDA/1.3 DVB, 0.86 Equivalent $Ca(OH)_2$ The styrene acrylic dispersion of Example 4 was prepared in the same manner as Example 2 except that 0.86 equivalents $Ca(OH)_2$ was charged to a 200 g aliquot of the latex made in Example 1. The calcium slurry contained 2.88 g of $Ca(OH)_2$, 6.51 g DI water, 0.07 TAMOL 945 dispersant (45%).

Example 5: 20.0 BA/26 MMA/40 STY/12.1 MAA/1.9 GMA-IDA/1.3 DVB

The styrene acrylic dispersion of Example 5 was prepared in the same manner as Example 1 except that Feed K was changed from Thorcowet TDA-40 to Lipocol LA-23 (1.61 wt % (BOM)). The polymer was prepared using a monomer emulsion containing a ratio of monomer described above.

Example 6: 20.0 BA/26 MMA/40 STY/12.1 MAA/1.9 GMA-IDA/1.3 DVB, 0.60 Equivalent $Ca(OH)_2$ The styrene acrylic dispersion of Example 6 was prepared in the same manner as Example 2 except 0.60 equivalents $Ca(OH)_2$ was charged to a 300 grams aliquot of the latex made in Example 5. The $Ca(OH)_2$ slurry contained 3.59 g of $Ca(OH)_2$, 17.18 DI water, and 0.22 g of TAMOL 945 dispersant (45%).

Example 7: 20.0 BA/26 MMA/40 STY/12.1 MAA/1.9 GMA-IDA/1.3 DVB, 0.860 Equivalent $Ca(OH)_2$ The styrene acrylic dispersion of Example 7 was prepared in the same manner as Example 2 except 0.860 equivalents $Ca(OH)_2$ was charged to a 300 g aliquot of the latex made in Example 5. The calcium slurry contains 5.09 g of $Ca(OH)_2$, 28.0 g DI water and 0.24 g of TAMOL 945 dispersant.

Example 8: 22.5 BA/29.1 MMA/34.2 STY/8.9 MAN 4.0 GMA-IDA/1.3 DVB

The styrene acrylic dispersion of Example 8 was prepared in the same manner as Example 1 except that 4.0 wt % of the monomeric chelant GMA-IDA (63.00 g) was used. The polymer was prepared using a monomer emulsion containing the following levels of monomers. (BA (83.91 g), MMA (108.5 g), STY (127.6 g), MAA (33.11 g), DVB (4.8 g). All the other ingredients remained the same.

Example 9: 23.5 BA/30.1 MMA/34.3 STY/8.9 MAA/1.9 AGE-IDA/1.3 DVB

The styrene acrylic dispersion of Example 9 contains the monomeric chelant AGE-IDA (1.9 wt %). The polymer latex was prepared in the same manner as Example 1 except that the monomeric chelant used was AGE-IDA, 33% solids (21.3 g). The monomer mixture, Feed C, was also short fed over 30 minutes instead of 120 minutes to promote better incorporation and reactivity of the chelant. The polymer was prepared using a monomer emulsion containing the following levels of monomers. (BA (87.59 g), MMA (112.16 g), STY (127.61 g), MAA (33.48 g), DVB (4.8 g). All the other ingredients remained the same.

Example 10: 23.5 BA/30.1 MMA/34.3 STY/8.9 MAA/1.9 AGE-IDA/1.3 DVB, 0.576 Equivalent $Ca(OH)_2$ The styrene acrylic dispersion of Example 10 was prepared in the same manner as Example 2 except 0.576 equivalents $Ca(OH)_2$ was charged to a 300 g aliquot of the latex made in Example 9. The $Ca(OH)_2$ slurry contained 3.67 g of $Ca(OH)_2$, 8.89 g DI water, and 0.10 g of TAMOL 945 dispersant (45%).

Example 11: 23.5 BA/30.1 MMA/34.3 STY/8.9 MAA/1.9 AGE-IDA/1.3 DVB, 0.86 Equivalent $Ca(OH)_2$ The styrene acrylic dispersion of Example 11 was prepared in the same manner as Example 2 except 0.86 equivalents $Ca(OH)_2$ was charged to a 300 g aliquot of the latex made in Example 9. The calcium contains 5.48 g of Ca $(OH)_2$, 12.51 g DI water and 0.13 g of TAMOL 945 dispersant.

Example 12: 23.5 BA/30.1 MMA/34.3 STY/8.9 MAA/1.9 AGE-ED3A/1.3 DVB

The styrene acrylic dispersion of Example 12 contains the monomeric chelant AGE-ED3A (1.9 wt %). The polymer latex was prepared in the same manner as Example 1 except that the monomeric chelant used was AGE-ED3A (6.99 g). The monomer was added to the kettle prior to the polymerization to promote better incorporation and reactivity of the chelant. The polymer was prepared using a monomer emulsion containing a ratio of monomer described above.

Example 13: 23.5 BA/30.1 MMA/34.3 STY/8.9 MAA/1.9 AGE-ED3A/1.3 DVB, 0.58 Equivalent $Ca(OH)_2$ The styrene acrylic dispersion of Example 13 was prepared in the same manner as Example 2 except 0.58 equivalents $Ca(OH)_2$ was charged to a 300 g aliquot of the latex made in Example 12. The $Ca(OH)_2$ slurry contained 2.95 g of $Ca(OH)_2$, 6.85 g DI water, and 0.074 g of TAMOL 945 dispersant (45%)

Example 14: 23.5 BA/30.1 MMA/34.3 STY/8.9 MAA/1.9 AGE-ED3A/1.3 DVB, 0.860 Equivalent $Ca(OH)_2$ The styrene acrylic dispersion of Example 14 was prepared in the same manner as Example 2 except 0.860 equivalents $Ca(OH)_2$ was charged to a 300 g aliquot of the latex made in Example 12. The $Ca(OH)_2$ slurry contained 4.49 g of $Ca(OH)_2$, 10.62 g DI water, and 0.115 g of TAMOL 945 dispersant (45%).

Example 15: 23.5 BA/30.1 MMA/34.3 STY/8.9 MAA/1.9 VBC-IDA/1.3 DVB

The styrene acrylic dispersion of Example 15 contains the monomeric chelant VBC-IDA (1.9 wt %). The polymer latex was prepared in the same manner as Example 1 except that a solution containing the monomeric chelant VBC-IDA (41%), (17.10 g), DI Water (12.61 g) and Disponil FES 77 ((33%), 5.66 g) was added to the kettle prior to the polymerization to promote better incorporation and reactivity of the chelant. The polymer was prepared using a monomer emulsion containing a ratio of monomer described above.

Comparative A: 23.5 BA/30.1 MMA/34.2 STY/9.0 MAA/1.9 IA/1.3 DVB

The styrene acrylic dispersion of Comparative Example A contains 1.9 wt % of itaconic acid. The polymer latex was prepared in the same manner as Example 1 except that the itaconic acid was added upfront in the kettle to promote better incorporation and reactivity. The polymer was prepared using a monomer emulsion containing a ratio of monomer described above.

Comparative B: 23.5 BA/30.1 MMA/34.2 STY/9.0 MAA/1.9 IA/1.3 DVB, 0.27 Equivalent $Ca(OH)_2$ The styrene acrylic dispersion of Comparative B was prepared in the same manner as Example 2 except 0.27 equivalents $Ca(OH)_2$ was charged to a 300 grams aliquot of the latex made in Comparative A. The $Ca(OH)_2$ slurry contained 1.529 g of $Ca(OH)_2$, 3.91 DI water, and 0.04 g of TAMOL 945 dispersant (45%).

Comparative C: 23.5 BA/30.1 MMA/34.2 STY/9.0 MAA/1.9 IA/1.3 DVB, 0.58 Equivalent $Ca(OH)_2$ The styrene acrylic dispersion of Comparative C was prepared in the same manner as Example 2 except 0.58 equivalents $Ca(OH)_2$ was charged to a 300 g aliquot of the latex made in Comparative A. The calcium slurry contains 3.24 g of $Ca(OH)_2$, 7.68 g DI water and 0.08 g of TAMOL 945 dispersant.

Comparative D: 23.5 BA/30.1 MMA/34.2 STY/9.0 MAA/1.9 IA/1.3 DVB 0.86 Equivalent $Ca(OH)_2$ The styrene acrylic dispersion of Comparative D was prepared in the same manner as Example 2 except 0.86 equivalents $Ca(OH)_2$ was charged to a 300 g aliquot of the latex made in Comparative A. The calcium slurry contains 4.84 g of $Ca(OH)_2$, 11.1 g DI water and 0.12 g of TAMOL 945 dispersant.

Comparative E: 20.0 BA/26 MMA/40 STY/12.1 MAA/1.9 IA/1.3 DVB, 0.860 Equivalent $Ca(OH)_2$ The styrene acrylic dispersion of Comparative E contains the 1.9 wt % of itaconic acid (IA) The pre-polymer latex was prepared in the same manner as Example 1 except 1.9 wt % itaconic acid was used instead of GMA-IDA. 0.86 equivalents Ca(OH)$_2$ was then charged to a 300 g aliquot of the pre-polymer in the same manner as Example 2. The calcium slurry contains 4.79 g of Ca(OH)$_2$, 11.0 g DI water and 0.11 g of TAMOL 945 dispersant.

Comparative F: 23.5 BA/30.1 MMA/34.2 STY/10.9 MAN 1.3 DVB

The styrene acrylic dispersion of Comparative F does not contain any IA or the monomeric chelant GMA-IDA. Instead, it contains 10.9 wt % methacrylic acid. The polymer latex was prepared in the same manner as Example 1 except that there was no IA or GMA-IDA. The polymer was prepared using a monomer emulsion containing a ratio of monomer described above.

Comparative G: 23.5 BA/30.1 MMA/34.2 STY/10.9 MAN 1.3 DVB 0.27 Equivalent Ca(OH)$_2$ The styrene acrylic dispersion of Comparative G was prepared in the same manner as Example 2 except that 0.27 equivalents Ca(OH)$_2$ was charged to a 300 grams aliquot of the latex made in Comparative F. The Ca(OH)$_2$ slurry contained 1.42 g of Ca(OH)$_2$, 3.50 DI water, and 0.04 g of TAMOL 945 dispersant (45%).

Comparative H: 23.5 BA/30.1 MMA/34.2 STY/10.9 MAN 1.3 DVB 0.57 Equivalent Ca(OH)$_2$ The styrene acrylic dispersion of Comparative H was prepared in the same manner as Example 2 except 0.57 equivalents Ca(OH)$_2$ was charged to a 300 g aliquot of the latex made in Comparative F. The calcium slurry contains 3.02 g of Ca(OH)$_2$, 7.78 g DI water and 0.08 g of TAMOL 945 dispersant.

Comparative I: 23.5 BA/30.1 MMA/34.2 STY/10.9 MAN 1.3 DVB 0.86 Equivalent Ca(OH)$_2$ The styrene acrylic dispersion of Comparative I was prepared in the same manner as Example 2 except 0.86 equivalents Ca(OH)$_2$ was charged to a 300 g aliquot of the latex made in Comparative F. The calcium slurry contains 4.52 g of Ca(OH)$_2$, 10.5 g DI water and 0.10 g of TAMOL 945 dispersant.

Comparative J

The styrene acrylic dispersion of Comparative J was prepared by adding 1.9 wt % iminodiacetic acid (IDA, 2.23 g in 9.00 DI Water) to 300 grams aliquot of the latex made in Comparative F. This was followed by adding a slurry containing 4.53 g of Ca(OH)$_2$, 11 g DI water and 0.10 g TAMOL 945 dispersant corresponding to 0.86 equivalents Ca.

Analytical Measurements

The stability of the samples was also assessed for colloidal stability and sedimentation of the calcium. The degree of calcium sedimentation after standing quiescent for at least one week was rated on a scale of from 1 to 5, wherein:
   5=no sediment (most desirable),
   4=negligible sediment,
   3=slight sediment,
   2=moderate sediment, and
   1=heavy sediment (least desirable).

Differential Scanning Calorimetry (DSC):

Glass transition temperature (T$_g$) analysis were performed at a heating rate of 10° C./min using a TA Instruments DSC (Model Q1000) equipped with an autosampler and cooled using a refrigeration cooling apparatus. The T$_g$ was reported as the transitional midpoint during the second heat.

Dynamic Mechanical Analysis:

The polymer emulsions supplied were cast in fluoropolymer Petri dishes and allowed to air dry for 48 h. The resulting polymer did not form a film but produced many small pieces. These pieces were melt pressed at 400° F. to produce void free films which could be used for testing. Even though these samples all contained 1.3% DVB, they all melt pressed reasonably well with the exception of Example 3, Example 4, Comparative Example B and Comparative Example C. This is discussed further in the Results section. All tests were performed on the Rheometrics Mechanical Spectrometer (RMS-800) using 8 mm parallel plate fixtures. The tests were performed using a Dynamic Temperature Ramp Mode from 180° C. to 40° C. at a cooling rate of 2° C./min. An applied frequency of 6.28 radians per second was used at an initial commanded strain of 0.25%. The Auto-Strain option was employed to adjust the strain by 40% when the torque dropped below 0.35 g/cm or exceeded 150 g/cm. The AutoTension option was also employed to maintain a constant normal force on the samples during testing. The plates were zeroed at the initial temperature of 180° C. Samples were loaded into the instrument at 180° C. and allowed to melt. The sample thickness was recorded the start of the test. The dynamic storage and loss moduli (G' and G") and tan δ are recorded as a function of temperature during the test.

Floor Polish Test Methods

The method for applying the coating compositions is described in Annual Book of ASTM Standards, Section 15, Volume 15.04, test procedure ASTM D 3153, except that 0.04 mL. per square inch coating was applied to vinyl composition substrates [12 inch (305 mm)×12 inch (305 mm)×⅛ inch (3.2 mm) ARMSTRONG EXCELON Vinyl Composition Tile Pattern 56790 and 56830, commercially available from Armstrong World Industries, Inc, Lancaster, Pa. 17604. Up to 4 coats were applied based on the test.

Black Heel Mark (BHM) and Scuff Resistance:

The method for determining black heel and scuff resistance is described in Chemical Specialty Manufacturers Association Bulletin No. 9-73 using a Snell Capsule, except commercially available rubber shoe heels were used in place of the recommended 2 inch (50.8 mm) rubber cubes. We determined the percentage of the coated substrate area, which was covered by black heel and scuff marks; this is conveniently performed with transparent graph paper. Black heel marks are an actual deposition of rubber onto or into the coating. A scuff mark, on the other hand, results from a physical displacement of the coating and appears as an area of reduced gloss. Scuff and black heel marks can occur simultaneously at the point where the heel impacts the substrate; i.e., upon removal of a black heel mark, a scuff may be present. Black heel marks were determined on white vinyl composition tile and scuff marks were determined on black vinyl composition tile. The degree of damage to the coating surface was rated as follows:

| Rating | Rating Scale 1-10 | Description |
| --- | --- | --- |
| Outstanding | 9-10 | Very few or no black heel or scuff marks on tile |
| Excellent | 7-8 | Slight scattering of black heel or scuff marks on tile |
| Very Good (V. Good) | 5-6 | Slight-moderate scattering of black heel or scuff marks on tile |
| Good | 3-4 | Moderate scattering of black heel or scuff marks on tile |
| Fair | 2-3 | Moderate-heavy scattering of black heel or scuff marks on tile |
| Poor | 0-1 | Heavy scattering of black heel or scuff marks on tile |

Wipe off of the black mark from the coated surface was achieved by manually rubbing the coated surface with tissue paper.

Gloss and Recoat Gloss:

The method for determining the gloss performance and recoat gloss performance of polish formulations is described in *Annual Book of ASTM Standards*, Section 15, Volume 15.04, test procedure ASTM D 1455 (2000). Gloss was determined on black vinyl composition tile.

Detergent Resistance:

The detergent resistance test is performed on black vinyl composition tile coated with four coats of the test finish. The coating is allowed to dry for 16 to 20 hours before running this test. The coated tile is then scrubbed using a Gardner Scrub Machine with a hogs hair bristle brush for 50 cycles with 10 mLs of detergent solution. The detergent solution used is a 1:20 dilution of GP FORWARD (available from Diversey Inc. of Sturtevant, Wis. 53177 USA) in water. At the end of this test the tile is allowed to air dry. Evaluate the tile for any discoloration or damage to the coating. The detergent resistance was rated on a scale of from 1 to 5, as follows:

1=poor, more than 20 percent of film removed;
2=fair, 11-20 percent of film removed;
3=good, 6-10 percent of film removed;
4=very good, slight gloss reduction and/or less than 5 percent of the film removed;
5=excellent, no water mark or perceptible damage to the film.

Water Resistance:

The water resistance test is performed on black tile coated with four coats of the test finish. The coating is allowed to dry for 16 to 20 hours before running this test. A circle (approximately one inch (2.54 cm) in diameter) is drawn on the dry coating with a china marker. Clean deionized water is deposited until the water spreads out to fill the circle contacting the four coats of finish. The water spot is allowed to stand for sixty minutes at ambient temperature. At the end of sixty minutes, the spot of water is removed by blotting the area with a dry tissue and the circle is evaluated for any discoloration or damage to the film.

The following ratings were applied to the films after being exposed to a water drop for 1 hour and wiped off:

Exc=no effect,
TrWh=Trace whitening,
Wh=whitening,
Hwh=heavy whitening,
Bl=blisters.

Slip Resistance:

ASTM D-2047 (2000) was used to determine slip resistance (Static Coefficient of Friction—S.C.O.F.) of the coated vinyl composition tiles.

Film Formation:

First, allow a clean, black vinyl composition tile to equilibrate in a refrigerator set at 10° C. for at least two hours. After the equilibration time, remove the tile from the refrigerator and draw-down 0.4 milliliters of the test polish by means of a 2 inch (50.8 mm) wide blade applicator (reference ASTM D-1436 method D (2000) over a 4-inch (101.6 mm) long section of the tile. In the same way, draw-down a control polish with known film formation performance. Immediately after the draw-down applications, return the tile to the refrigerator and allow the polishes to dry completely. Rate the polish films in the following manner:

Excellent (Exc)—No cracking/crazing;
Very Good (V. Good)—Slight edge cracking/crazing;
Good—Definite edge cracking/crazing;
Fair—Definite edge cracking/crazing with very slight center cracking/crazing;
Poor—Complete edge and center cracking/crazing.

Tack-Free Time Test Method:

A coat of four milliliters of test coating is applied to the surface of the tile and allowed to sit until apparent dryness (when coating film appears dry). At this point, the tack tester is placed on the coating film (1 inch square [645.16 mm$^2$] surface). A 500 gram weight is placed on the tack testers' one inch square surface and allowed to sit for five seconds and then removed. If more than five seconds are required for the testers' foot to pull completely away from the coating film, the surface is considered to be not tack free; and the test is repeated in one minute intervals until the tack free time is determined. The value is recorded in minutes from application time.

The tack tester apparatus details are: a piece of 1/16 inch (1.59 mm) thick×1 inch (25.4 mm) wide×3¼ inch (82.55 mm) long piece of aluminum is bent at an angle so that a 1 inch square (645.16 mm$^2$) area may be set on the surface of the coating film. The angle of this bend is determined by trial and error processes until it is found that the weight of the upper 2¼ inch (57.15 mm) arm section and its angle are such that it will just balance when a 5 gram weight is placed on the 1 inch square (645.16 mm$^2$) surface on a dry flat substrate. The conditions of determining the tack free time where: 23° C. and 16% relative humidity.

Soil Resistance/Color Measurements:

The soiling test was performed using Gardner Washability Machine fitted with a Dayton Split Phase Motor Model No. 6K40 2B and a pulley system that had been modified to hold a carpet-covered roller. Approximately 2 grams of synthetic soil [75 wt % graphite (powdered coke, approximately 100 mesh) and 25 wt % balsa wood flour] was sprinkled evenly on the roller and its track on the tile. The machine was run for 100 cycles (200 passes). During the cycling, the soil was occasionally brushed back into the roller track. At the end of the test the tile was wiped with a tissue to remove any loose soil and the color was measured.

Color measurements have been recorded in L* a* b* color space. A reflectance spectrophotometer is used to measure the color. The reported L* a* b* color values are an average of eight individual color measurements on a given coated floor tile. Color change is reported as a delta E* value. Delta E* is a single number that represents the distance between two color measurements over the L* a* b* color space. The delta E* value incorporates the total change in the L* (whiteness) a* (green-red) b* (blue-yellow) color space. The L* value can range from zero (black) to 100 (diffuse white). The * value can range from negative 100 (green) to positive 100 (magenta). The b* value can range from negative 100

(blue) to positive 100 (yellow). The larger the delta E* value the larger the change in color. Delta E* is determined by the equation:

$$\text{Delta } E^* = ((L^*_1 - L^*_2)^2 + (a^*_1 - a^*_2)^2 + (b^*_1 - b^*_2)^2)^{0.5}$$

Konig:

Using Byko-drive, an automatic film applicator draw down machine available from Byk-Gardner, Columbia, Md. 21046 USA and a wire rod #10, an aluminum plate (size 4 inch (101.6 mm)×12 inch (305 mm)) is coated. The coated aluminum is then allowed to cure in a constant temperature room (24° C., 50% RH) on a bench top. Konig hardness measurements of the coated surface are then determined at 1, 3, 7 and 10 days to determine the extent of surface cure using a Pendulum Hardness Tester (Cat. No. PH-5858) from Byk-Gardner, Columbia, Md. 21046 USA. After 10 days, scratch resistance is determined.

Scratch and Mar Resistance:

A cut of coated aluminum plate (3 and ⅛ inch (79.38 mm)) from the panels coated for Konig hardness determinations is fitted snugly at the bottom of a ½ gallon (1.89 liter) plastic container. A coated metal lid is placed inside the plastic container. The closed container is then shaken side to side for 2 minutes (120 seconds). The scratched tile is then compared to standard scratch plates that have been exposed to shaking at of 15, 30, 60, 120, 180 sec to determine the scratch rating. The degree of damage to the coating surface was rated on a scale of from 1 to 10, with 1=very visibly scratched and 10=the coating cannot be easily scratch.

Floor Wear Tests for Polish Film Removal:

The floor wear test areas were stripped of residual polish and repolished in the typical janitorial procedure. The floors were dust mopped to remove loose dirt, and a commercial floor coating stripper FREEDOM® (available from Diversey Inc. of Sturtevant, Wis. 53177 USA) which contained multiple reagents to swell the polymer film including: solvents, such as diethylene glycol monoethyl ether, benzyl alcohol, amines such as monoethanolamine, and bases such as sodium hydroxide was diluted with clean tap water generating a dilution solution of 1 part FREEDOM stripper and 4 parts clean tap water and applied by string mop at a rate of ca. 1,000 square feet/gallon (24.5 m²/liter); after a five minute soak period, the floors were scrubbed with a SIDEWINDER 24 inch (609.6 mm) Propane Floor Stripper (Model P24KS20) (available from Aztec of Montgomeryville, Pa. 18936 USA); the stripped floors were thoroughly rinsed twice by damp mopping with clear water, and allowed to dry. The stripped floors were divided into 20 square foot (1.86 m²) sections perpendicular to the normal direction of floor traffic flow. To each of the sections four coats of polish to be tested were applied, with a string mop at a rate of ca. 2,000 square feet/gallon (49.1 m²/liter). Each coat was allowed to dry for thirty minutes before the next coat was applied.

Coatings were applied to floors composed of vinyl composition tiles, and cured at ambient conditions for a specific time prior to opening the floors to pedestrian traffic. The floor test areas were exposed to foot traffic as well as wheeled traffic from maintenance carts, sample trays and food carts, etc. The floor test areas were further exposed to daily scrubbing with STRIDE® neutral cleaner (available from Diversey Inc. of Sturtevant, Wis. 53177 USA) using a dilution rate of 1:128 (cleaner:tap water) the cleaner was deposited using a PE-1700 (Serial No. 64734) AutoScrubber (available from Amano Pioneer Eclipse Corp. of Sparta, N.C. 28675 USA) fitted with a 3M 5100 Red Buffer Pad (available from 3M Company, of St. Paul, Minn. 55101 USA). The floors were exposed to one pass of the PE-1700 Autoscrubber. Following the scrubbing operation with cleaner, machine burnishing maintenance was performed on the test floors using a SPEEDSTAR ST21 KWA (Serial No. 61698) propane floor burnisher (available from Pioneer Eclipse Corp, of Sparta, N.C. 28675 USA) fitted with a 3M 3100 Aqua Burnish Pad (available from 3M Company, of St. Paul, Minn. 55101 USA). The test floors were exposed to two passes of the burnishing machine.

After 6 months of exposure to pedestrian traffic and maintenance operations, the floors were dust mopped to remove loose dirt, and a commercial floor coating stripper FREEDOM® (available from Diversey Inc. of Sturtevant, Wis. 53177 USA) which contained multiple reagents to swell the polymer film including: solvents, such as diethylene glycol monoethyl ether, benzyl alcohol; amines such as monoethanolamine; and bases such as sodium hydroxide, was diluted with clean tap water generating a dilution solution of 1 part FREEDOM stripper and 4 parts clean tap water and applied by string mop at a rate of approximately 1,000 square feet per gallon (24.5 m²/liter); after a five minute soak period, the floors were scrubbed with a SIDEWINDER 24 inch (609.6 mm) Propane Floor Stripper (Model P24KS20) (available from Aztec, of Montgomeryville, Pa. 18936 USA); the stripped floors were thoroughly rinsed twice by damp mopping with clear water, and allowed to dry. The polish coatings were evaluated for film removal. The following rating was employed for assessing the removability:

Excellent—100% coating removal;
Fair—50% coating removal;
Poor—0% coating removal.

Polymerization and Calcium Crosslinking

The incorporation of monomers with chelant functionality to the polymer was expected to significantly improve the calcium binding ability of the polymer and provide crosslinking characteristics similar to that provided by traditional zinc-MAA/AA crosslinking interactions or possibly better.

As specified in Tables 3 and 4 above, four different vinyl aminocarboxylate monomers, GMA-IDA, AGE-IDA and VBC-IDA, were successfully copolymerized with traditional vinyl monomers to produce chelating copolymers for floor care applications. To assess the chelating action of the chelating copolymer, they were cross-linked with Ca(OH)$_2$ by charging varying levels of Ca(OH)$_2$ slurry at 0.27 to 0.86 eq. The percent calcium incorporation was calculated using the equation:

$$\left( \frac{g\text{Ca(OH)}_{2\ charged} - g\text{Ca(OH)}_{2\ recovered}}{g\text{Ca(OH)}_{2\ charged}} \right) \times 100$$

where g Ca(OH)$_2$ $_{recovered}$ is the amount of calcium recovered after filtering using 100 and 325 mesh screens, and drying.

TABLE 3

Polymer Compositions

| Example | BA wt % | MMA wt % | STY wt % | MAA wt % | DVB wt % | IA wt % | GMA_IDA wt % | AGE-IDA wt % | AGE-ED3A | VBC-IDA wt % | IDA (Post Added) wt % | Ca(OH)$_2$ Equiv |
|---|---|---|---|---|---|---|---|---|---|---|---|---|
| 1 | 23.5 | 30.1 | 34.3 | 8.9 | 1.3 | — | 1.9 | — | — | — | — | — |
| 2 | 23.5 | 30.1 | 34.3 | 8.9 | 1.3 | — | 1.9 | — | — | — | — | 0.270 |
| 3 | 23.5 | 30.1 | 34.3 | 8.9 | 1.3 | — | 1.9 | — | — | — | — | 0.577 |
| 4 | 23.5 | 30.1 | 34.3 | 8.9 | 1.3 | — | 1.9 | — | — | — | — | 0.859 |
| 5 | 19.7 | 25.7 | 39.5 | 11.9 | 1.3 | — | 1.9 | — | — | — | — | — |
| 6 | 19.7 | 25.7 | 39.5 | 11.9 | 1.3 | — | 1.9 | — | — | — | — | 0.601 |
| 7 | 19.7 | 25.7 | 39.5 | 11.9 | 1.3 | — | 1.9 | — | — | — | — | 0.860 |
| 8 | 22.5 | 29.1 | 34.2 | 8.9 | 1.3 | — | 4.0 | — | — | — | — | — |
| 9 | 23.5 | 30.1 | 34.3 | 8.9 | 1.3 | — | — | 1.9 | — | — | — | — |
| 10 | 23.5 | 30.1 | 34.3 | 8.9 | 1.3 | — | — | 1.9 | — | — | — | 0.577 |
| 11 | 23.5 | 30.1 | 34.3 | 8.9 | 1.3 | — | — | 1.9 | — | — | — | 0.859 |
| 12 | 23.5 | 30.1 | 34.3 | 8.9 | 1.3 | — | — | — | 1.9 | — | — | — |
| 13 | 23.5 | 30.1 | 34.3 | 8.9 | 1.3 | — | — | — | 1.9 | — | — | 0.577 |
| 14 | 23.5 | 30.1 | 34.3 | 8.9 | 1.3 | — | — | — | 1.9 | — | — | 0.859 |
| 15 | 23.5 | 30.1 | 34.3 | 8.9 | 1.3 | — | — | — | — | 1.9 | — | — |
| Comparative A | 23.5 | 30.1 | 34.2 | 9.0 | 1.3 | 1.9 | — | — | — | — | — | — |
| Comparative B | 23.5 | 30.1 | 34.2 | 9.0 | 1.3 | 1.9 | — | — | — | — | — | 0.270 |
| Comparative C | 23.5 | 30.1 | 34.2 | 9.0 | 1.3 | 1.9 | — | — | — | — | — | 0.577 |
| Comparative D | 23.5 | 30.1 | 34.2 | 9.0 | 1.3 | 1.9 | — | — | — | — | — | 0.859 |
| Comparative E | 19.7 | 25.7 | 39.5 | 11.9 | 1.3 | 1.9 | — | — | — | — | — | 0.860 |
| Comparative F | 23.5 | 30.1 | 34.2 | 10.9 | 1.3 | — | — | — | — | — | — | — |
| Comparative G | 23.5 | 30.1 | 34.2 | 10.9 | 1.3 | — | — | — | — | — | — | 0.270 |
| Comparative H | 23.5 | 30.1 | 34.2 | 10.9 | 1.3 | — | — | — | — | — | — | 0.574 |
| Comparative I | 23.5 | 30.1 | 34.2 | 10.9 | 1.3 | — | — | — | — | — | — | 0.859 |
| Comparative J | 23.5 | 30.1 | 34.2 | 10.9 | 1.3 | — | — | — | — | — | 1.9 | 0.859 |

TABLE 4

Polymer Characterizations Data

| Example # | Acid/Co Acid | Chelant | PS (nm) | PH | VISC. (cPs) | SOLIDS wt % |
|---|---|---|---|---|---|---|
| 1 | MAA (8.9%) | GMA-IDA (1.9%) | 56.9 | 6.9 | 62.0 | 38.8 |
| 2 | MAA (8.9%) | GMA-IDA (1.9%) | 58.8 | 8.7 | 92.0 | 37.3 |
| 3 | MAA (8.9%) | GMA-IDA (1.9%) | 59.5 | 9.8 | 71.5 | 37.2 |
| 4 | MAA (8.9%) | GMA-IDA (1.9%) | 58.0 | 10.7 | 53.5 | 37.7 |
| 5 | MAA (11.9%) | GMA-IDA (1.9%) | — | — | — | 38.3 |
| 6 | MAA (11.9%) | GMA-IDA (1.9%) | 85.9 | 9.0 | 31.0 | 37.0 |
| 7 | MAA (11.9%) | GMA-IDA (1.9%) | 88.2 | 9.1 | 38.0 | — |
| 8 | MAA (11.9%) | GMA-IDA (4.0%) | 54.0 | 6.6 | 100.5 | 36.1 |
| 9 | MAA (8.9%) | AGE-IDA (1.9%) | — | — | — | 36.5 |
| 10 | MAA (8.9%) | AGE-IDA (1.9%) | 77.7 | 9.0 | 15.0 | 35.8 |
| 11 | MAA (8.9%) | AGE-IDA (1.9%) | 85.2 | 10.0 | 29.0 | 35.4 |
| 12 | MAA (8.9%) | AGE-ED3A (1.9%) | 144.3 | 7.3 | 20.0 | 38.4 |
| 13 | MAA (8.9%) | AGE-ED3A (1.9%) | 154.3 | 10.0 | 23.5 | 36.6 |
| 14 | MAA (8.9%) | AGE-ED3A (1.9%) | 153.9 | 11.2 | 16.0 | 36.1 |
| 15 | MAA (8.9%) | VBC-IDA (1.9%) | 96.7 | — | — | 39.5 |
| Comparative A | MAA/IA (9.0%, 1.9%) | None | 60.0 | 2.9 | — | 40.1 |
| Comparative B | MAA/IA (9.0%, 1.9%) | None | 60.4 | 8.2 | 31.5 | 37.9 |
| Comparative C | MAA/IA (9.0%, 1.9%) | None | 65.2 | 9.6 | 30.0 | 38.2 |
| Comparative D | MAA/IA (9.0%, 1.9%) | None | Gelled | Gelled | Gelled | Gelled |
| Comparative E | MAA/IA (11.9%, 1.9%) | None | Gelled | Gelled | Gelled | Gelled |
| Comparative F | MAA (10.9%) | None | 56.5 | 7.4 | 77.0 | 38.4 |
| Comparative G | MAA (10.9%) | None | 54.2 | 8.7 | 73.5 | 37.3 |
| Comparative H | MAA (10.9%) | None | 56.6 | — | 59.0 | 37.1 |
| Comparative I | MAA (10.9%) | None | Gelled | Gelled | Gelled | Gelled |
| Comparative J | MAA (10.9%) | IDA (1.9%) | 56.9 | 9.3 | 44.0 | 37.3 |

TABLE 5

Summary of Calcium Incorporation Studies

| Example # | Acid/Co Acid | Chelant | Ca(OH)$_2$ Charged Eqv. | Ca(OH)$_2$ % Incorpoated Eqv. | Ca(OH)$_2$ Sediment 1 Wk-12 Months |
|---|---|---|---|---|---|
| 2 | MAA (8.9 wt %) | GMA-IDA | 0.27 | 98.9% | None (5) |
| 3 | MAA (8.9 wt %) | GMA-IDA | 0.58 | 98.0% | Negligible (4) |

TABLE 5-continued

Summary of Calcium Incorporation Studies

| Example # | Acid/Co Acid | Chelant | Ca(OH)$_2$ Charged Eqv. | Ca(OH)$_2$ % Incorpoated Eqv. | Ca(OH)$_2$ Sediment 1 Wk-12 Months |
|---|---|---|---|---|---|
| 4 | MAA (8.9 wt %) | GMA-IDA | 0.86 | 98.5% | Negligible (4) |
| 6 | MAA (11.9 wt %) | GMA-IDA | 0.61 | 98.5% | Negligible (4) |
| 7 | MAA (11.9 wt %) | GMA-IDA | 0.85 | 99.6% | Slight (3) |
| 10 | MAA (8.9 wt %) | AGE-IDA | 0.58 | 99.8% | Slight (3) |
| 11 | MAA (8.9 wt %) | AGE-IDA | 0.86 | 99.6% | Heavy (1) |
| 13 | MAA (8.9 wt %) | AGE-ED3A | 0.57 | 100.0% | Negligible (4) |
| 14 | MAA (8.9 wt %) | AGE-ED3A | 0.86 | 100.0% | Negligible (4) |
| Comparative B | MAA/IA (9.0, 1.9 wt %) | None | 0.27 | 97.6% | None (5) |
| Comparative C | MAA/IA (9.0, 1.9 wt %) | None | 0.58 | 86.9% | Slight (3) |
| Comparative D | MAA/IA (9.0, 1.9 wt %) | None | 0.86 | Gelled | Gelled |
| Comparative E | MAA/IA (11.9, 1.9 wt %) | None | 0.86 | Gelled | Gelled |
| Comparative G | MAA (10.9) | None | 0.27 | 91.0% | Slight (3) |
| Comparative H | MAA (10.9) | None | 0.57 | 98.3% | Negligible (3) |
| Comparative I | MAA (10.9) | None | 0.86 | Gelled | Gelled |
| Comparative J | MAA (10.9) | IDA | 0.86 | 99.2% | Moderate (2) |

The calcium cross-linked samples were also assessed for colloidal stability and sedimentation of the calcium. The degree of calcium sedimentation after standing quiescent for at least one week was rated on a scale of from 1 to 5, wherein 5=no sediment (most desirable),
4=negligible sediment,
3=slight sediment,
2=moderate sediment, and
1=heavy sediment (least desirable).

For these measurements, the absence of sediment indicates that complete reaction has occurred. The results are presented in Table 5. The addition of Ca(OH)$_2$ at 0.27 eq. to GMA-IDA based polymers produced a sediment-free emulsion product indicating complete reaction while the filtered emulsion product of Example 3 and 4 which contained 0.58 eq. and 0.86 eq. Ca(OH)$_2$ respectively, showed negligible sediment on standing undisturbed for 24 h. It is noted that no additional sediment formed after standing for 6 to 12 months. In Example 6, the addition of 0.60 eq. Ca(OH)$_2$ to an emulsion containing 11.9% acid produced negligible sediment upon standing, indicating that the extent of polymer reaction with the Ca(OH)$_2$ was identical with that of Example 3. On the other hand, the filtered emulsion of Example 7 showed slightly more sediment than that of Example 4, indicating that the increase in ionic content due to increased acid in the polymer in Example 7 reacted to a lesser extent than at 0.86 eq. of Example 3, which contained 8.9% acid. AGE-IDA based polymers produced slight and heavy sediment upon standing when charged with 0.58 and 0.86 eq. Ca(OH)$_2$ respectively. Allyl glycidyl ethers are known to be less reactive in copolymerization with acrylic monomers compared to glycidyl methacrylate, which has improved reactivity. The results therefore indicate poor incorporation of the AGE-IDA monomers in the polymer compared to the GMA-IDA monomer leading to poor stabilization of calcium in the AGE-IDA polymers at similar equivalents. ED3A is expected to have stronger metal ion binding properties than IDA and as shown in Table 5, the AGE-ED3A polymers of Example 13 and 14 showed significantly improved calcium stabilization compared to AGE-IDA based polymers of Example 10 and 11 at similar calcium equivalents. Comparative experiment involving traditional polymers containing MAA or a mixture of MAA and IA, and no aminocarboxylate groups were performed. At 0.27 equivalents, the percent Ca(OH)$_2$ incorporated was 97.6 for Comparative Example B which contained a mixture of MAA/IA, and 91.1% for Comparative Example G which contained only MAA. More significantly, attempts to charge 0.86 eq. Ca(OH)$_2$ to the traditional polymers resulted in total coagulation of the reaction, indicating that the traditional polymers provided poor stability at higher levels of calcium ions. These results also confirmed that the presence of chelating groups provided improved calcium binding ability especially at higher calcium levels.

The ability of free chelant to provide improved calcium incorporation and cross-linking was investigated by adding an aqueous solution of IDA to a polymer containing 10.9% MAA (Comparative J). The post-added chelant sample showed a slightly improved Ca(OH)$_2$ incorporation than the acrylate/chelant-based copolymer. However, after filtering and standing quiescent for 24 h, moderate chelant sediment developed. This indicates that while the free chelant provided improved stability to the latex, reaction occurred to a lesser extent than that of the GMA-IDA based copolymers, and slightly better than the AGE-IDA based copolymers at similar equivalents. It is also noted that acrylate/chelant copolymers are expected to provide a more favorable environmental profile over the free chelant at low polymer usage, provided the heavy metal ion mobility for the polymers are not similar to stronger amino carboxylate chelants, such as EDTA with significantly heightened environmental concerns.

The results confirmed that the presence of chelating groups provided improved calcium binding ability especially at higher equivalents calcium. GMA-IDA based emulsion polymers charged with 0.27 equivalents Ca(OH)$_2$ produced a sediment-free emulsion product. The addition of 0.58 eq. and 0.86 eq. Ca(OH)$_2$ proceeded successfully and showed only negligible sediment after 6-12 months. AGE-IDA based polymers produced slight and heavy sediment upon standing when charged with 0.58 and 0.86 eq. Ca(OH)$_2$, respectively. Polymer compositions containing AGE-ED3A showed significantly improved calcium stabilization compared to AGE-IDA based police with only negligible sediment produced after standing. Comparative polymers containing no chelant component but instead containing methacrylic acid or a mixture of methacrylic and itaconic acid did not provide calcium stability and attempts to charge 0.86 eq. to these comparative polymers resulted in coagulation and total gelation of the batches. Another comparative emulsion polymer prepared by adding an aqueous solution of IDA to a polymer containing MAA showed improved calcium incorporation but produced moderate Ca(OH)$_2$ sediment after filtering and standing. This indicates that the reaction of the polymer with Ca(OH)$_2$ occurred to a lesser extent when the free chelant is added compared to GMA-IDA and AGE-ED3A based copolymers, where the reaction occurred to a greater extent. The DMA results confirmed improved calcium incorporation with improved calcium cross-linking properties for chelant based copolymers compared to traditional polymer compositions which did not contain the new aminocarboxylate groups. The chelant-based polymers provided gloss performance in floor polish that is comparable to the conventional floor polishes.

Additionally, the chelant polymers showed scratch resistance properties that were superior to the conventional floor polish.

Figure 2:
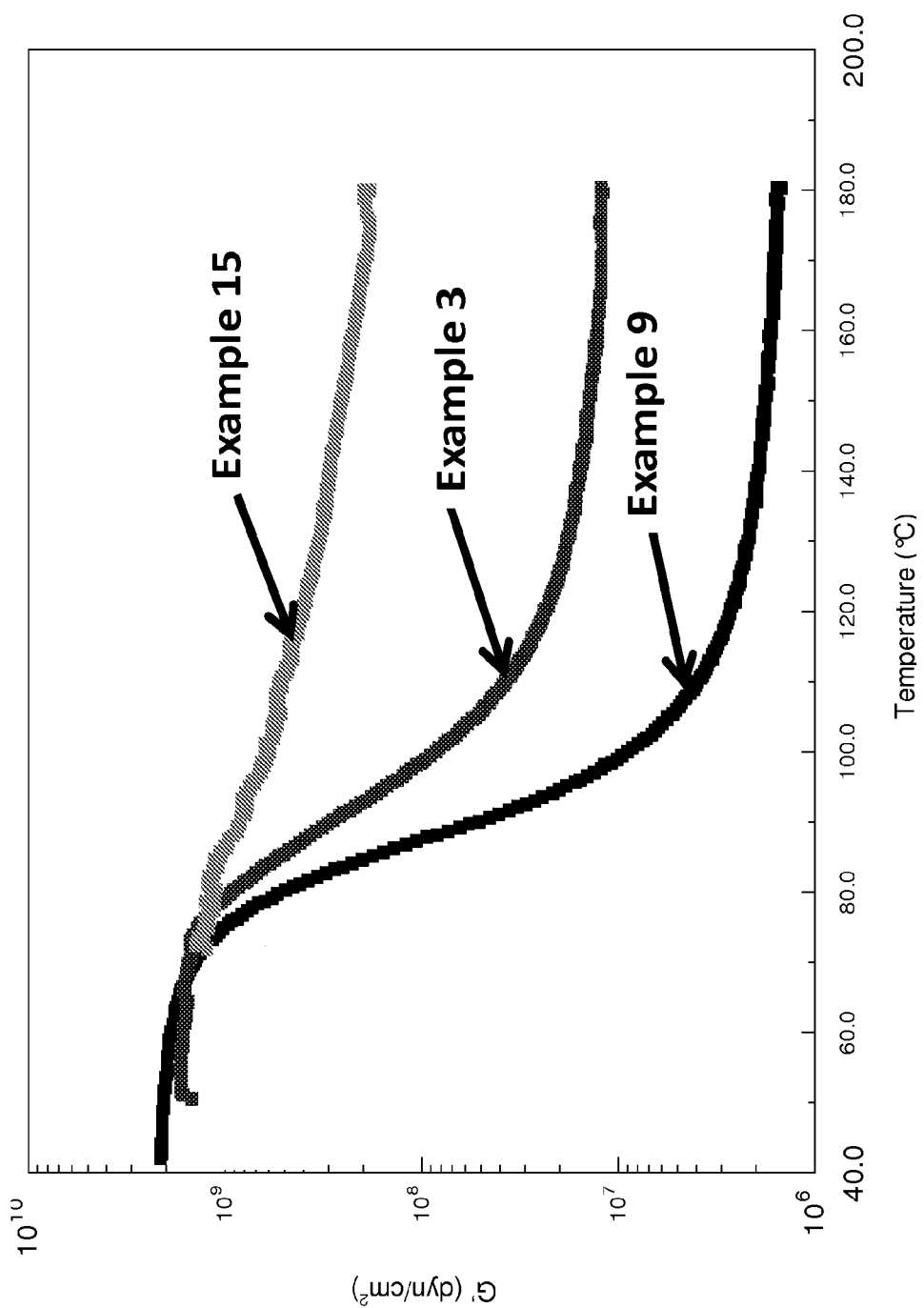
FIG. 2 is a plot of shear modulus (G') vs. temperature for Examples 15, 3 and 9.
Figure 3:
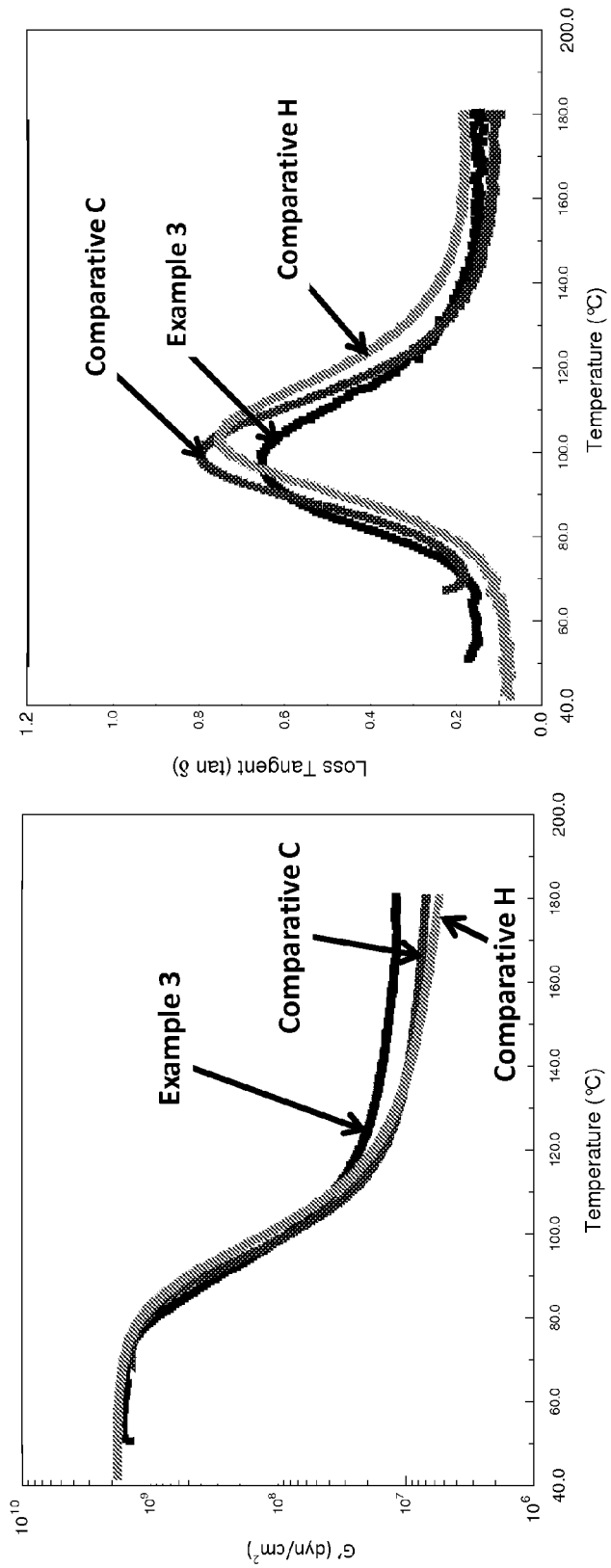
FIG. 3 is a plot of shear modulus (G') vs. temperature for Example 3, Comparative Example C and Comparative Example H.
Figure 4:
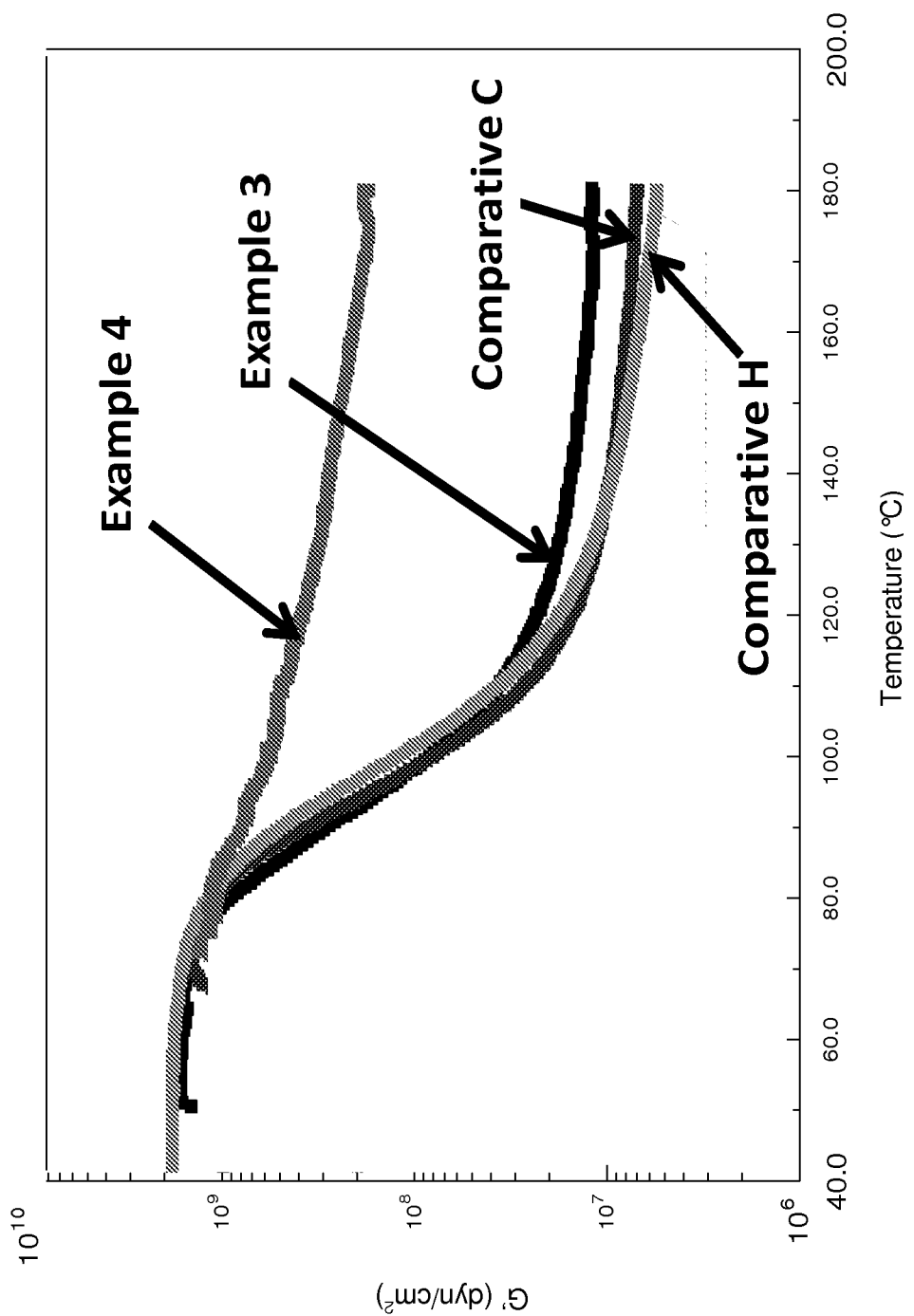
FIG. 4 is a plot of shear modulus (G') vs. temperature for Example 3, Example 4, Comparative Example C and Comparative Example H.

Furthermore, dynamic mechanical analysis was performed to investigate the mechanical performance of the chelant containing polymers. In general, increases in the level of calcium cross-linking results in a corresponding increase in the plateau modulus, as well as a decrease in the peak δ, indicating reduced or restricted molecular mobility. FIG. 1 shows the overlays of the shear modulus, G', and the loss tangent (tan δ) versus temperature plots for Comparative Examples F, G and H. Comparative Example F with no calcium cross-linking showed the lowest plateau modulus, G', and some downward slope to the G' curve at high temperature, showing that flow occurs even with the 1.3% DVB covalent cross-linking present. The addition of 0.27 equivalents Ca(OH)$_2$ increases the rubbery plateau modulus an order of magnitude while the tan δ peak is correspondingly smaller with a high temperature tan δ response that is more flatter (from 140-180° C.). At the 0.57 eq. Ca, the rubbery plateau modulus is again higher and the peak tan δ height is reduced further, showing less mobility of the chain segments due to the ionic clusters or cross-links present, indicating increased cross-linking. In FIG. 2, the overlays for GMA-IDA-based polymers are presented. Both Example 3 and 4 were extremely brittle, did not melt press well and contained voids, due to the high levels of both covalent and ionic cross-linking. As expected, increasing the calcium content from 0.27 to 0.58 increased the rubbery plateau modulus an order of magnitude. At 0.86 eq. the sample was significantly more brittle and the G' was several orders of magnitude higher compared to lower calcium cross-linked samples. FIG. 3 compares the shear modulus, G', and the loss tangent (tan δ) versus temperature plots for GMA-IDA-based polymer, Example 3, Comparative Example C and Comparative Example H, which did not contain any chelant functionality at 0.58 equivalent calcium charged. At similar metal equivalents, the chelant-based polymer showed a slightly higher plateau modulus and has a relatively lower tan δ peak than the traditional polymers without chelant. In FIG. 4, G' plots of Example 3 and 4, the GMA-IDA copolymers (0.860 and 0.58 eq. Ca, respectively), and Comparative Example C (0.58 eq., MAA/IA) are shifted vertically to match the glassy modulus of Comparative Example H (0.57 eq., MAA). From the charts, it is evident that Example 4 at 0.86 eq. is significantly more cross-linked compared to the others. The DMA results therefore confirmed improved calcium incorporation with improved calcium cross-linking properties for chelant based copolymers compared to traditional polymers which did not contain chelant functional groups.

Floor Polish Formulation and Polish Performance

The formulation listed in Table 6 was used for coating compositions of the examples provided. The amount of water was adjusted to maintain a solids level of 20% and compensate for differences in the solids content of each polymer. The materials are listed in order of addition. All Examples below were done on formulated coating compositions. The application results are presented in Table 7. As shown in Table 7, the chelant-based copolymers discussed in this report provided gloss performance in floor polish that is comparable to the conventional floor polish compositions. Furthermore, at similar calcium equivalents, the GMA-IDA-based polymers showed improved water and detergent resistance properties compared to polymers without the chelant. The conventional polymers showed better soiling resistance when compared to GMA-IDA copolymer at 0.27 and 0.58 eq. On the other hand, at 0.86 eq. Ca. the GMA-IDA polymers showed significantly improved soiling resistance when compared to Example 2 and 3 with 0.27 and 0.58 eq. respectively, and slightly better soiling resistance properties than the Comparative Examples. Black Heel Mark (BHM) resistance remained relatively unchanged for all samples, however, partial wipe-off of the BHM could be achieved for samples containing 0.58 eq. Ca(OH)$_2$, whereas at 0.86 eq. Ca, the BHM of tiles polished using the formulated finish of Example 4 containing 1.9% GMA-IDA could be easily wiped off.

Formulation of AGE-IDA polymers as well as GMA-IDA polymers containing 10.9% acid, and their polish properties are presented in Tables 8 and 9 respectively. The formulations were compared against a commercial control emulsion polymer DURAPLUS™ 3, which is a high acid, highly cross-linked zinc-containing polymer. All the polymers provided gloss performance in floor polish that is comparable to the conventional floor polishes. Additionally, the chelant polymers showed scratch resistance properties that were superior to the conventional floor polish based on DURAPLUS™ 3.

The formulations listed in Table 10 were applied to a floor as described in the Floor Polish Test Methods section and a formulation based on combination of Example 2 and Example 3 showed excellent removability that was equivalent to the conventional floor polish based on DURAPLUS 3 that is known for its excellent removability.

| Table of Other Ingredients Used in the Formulations | | |
|---|---|---|
| Ingredient | Function | Supplier |
| Water | Diluent | |
| KATHON ™ CG/ICP | Preservative | Dow Chemical, Midland, MI, U.S.A. |
| SILFOAM ® SE-21 | Defoamer | Wacker Chemie AG, Adrian, MI, U.S.A. |
| DC-73 | Defoamer | Dow Corning, Midland, MI, U.S.A. |
| MASURF ® FS-230 | Wetting Agent | Mason Chemical, Arlington Heights, IL., U.S.A. |
| ZONYL ® FSJ | Wetting Agent | Dupont, Wilmington, DE, U.S.A. |
| POLYFOX ® PF-156A | Wetting Agent | Omnova Solutions, Fairlawn, OH, U.S.A. |
| CHEMGUARD ™ S-761P | Wetting Agent | Chemguard, Mansfield, TX, U.S.A. |
| Diethylene glycol ethyl ether | Coalescent | Dow Chemical, Midland, MI, U.S.A. |
| Dipropylene glycol n-propyl ether | Coalescent | Dow Chemical, Midland, MI, U.S.A. |
| 2,2,4-Trimethyl-1,3-pentanediol diisobutyrate | Plasticizer | Eastman Chemical, Kingsport, TN, U.S.A. |
| Tributoxy Ethyl Phosphate | Leveling Agent | Rhodia, Bristol, PA. U.S.A. |
| SMA 17352 | Alkali Soluble Resin | Cray Valley, Exton, PA, U.S.A. |
| DURAPLUS ™ 3 | Polymer Emulsion | Dow Chemical, Midland, MI, U.S.A. |

-continued

Table of Other Ingredients Used in the Formulations

| Ingredient | Function | Supplier |
|---|---|---|
| CHEMREZ 30 | Alkali Soluble Resin | ChemCor, Chester, NY, U.S.A. |
| RHOPLEX ® 1531C | Alkali Soluble Resin | Dow Chemical, Midland, MI, U.S.A. |
| MICHEM ® Dispersion 89235DE | Wax Emulsion | Michelman, Inc., Cincinnati, OH, U.S.A. |
| MICHEM ® Dispersion 89640DE | Wax Emulsion | Michelman, Inc., Cincinnati, OH, U.S.A. |
| A-C 540N | Wax Emulsion | Honeywell, Morristown, NJ, U.S.A. |

TABLE 6

Floor Polish Formulation

| | Comp. H | Comp. C | Example 2 | Example 3 | Example 4 |
|---|---|---|---|---|---|
| Acid/Co-acid | MAA | MAA/IA | MAA | MAA | MAA |
| Chelant | None | None | GMA-IDA | GMA-IDA | GMA-IDA |
| $Ca^{2+}$ Level | 0.57 Eq | 0.58 Eq | 0.27 Eq | 0.58 Eq | 0.86 Eq |
| Material Name | Parts | Parts | Parts | Parts | Parts |
| Water | 42.28 | 43.41 | 42.49 | 42.38 | 42.9 |
| KATHON CG/ICP (1.5%) | 0.05 | 0.05 | 0.05 | 0.05 | 0.05 |
| SILFOAM SE-21 | 0.02 | 0.02 | 0.02 | 0.02 | 0.02 |
| MASURF FS-230 (1% active) | 0.96 | 0.96 | 0.96 | 0.96 | 0.96 |
| Diethylene Glycol Ethyl Ether | 4.79 | 4.79 | 4.79 | 4.79 | 4.79 |
| Dipropylene Glycol n-Propyl Ether | 0.40 | 0.40 | 0.40 | 0.40 | 0.40 |
| 2,2,4-Trimethyl-1,3-Pentanediol Diisobutyrate | 0.95 | 0.95 | 0.95 | 0.95 | 0.95 |
| Tributoxy Ethyl Phosphate | 2.12 | 2.12 | 2.12 | 2.12 | 2.12 |
| Example 2 | 0 | 0 | 39.21 | 0 | 0 |
| Example 3 | 0 | 0 | 0 | 39.32 | 0 |
| Example 4 | 0 | 0 | 0 | 0 | 38.8 |
| Comparative C | 0 | 38.29 | 0 | 0 | 0 |
| Comparative H | 39.42 | 0 | 0 | 0 | 0 |
| SMA 17352 (25%) | 3.79 | 3.79 | 3.79 | 3.79 | 3.79 |
| MICHEM Dispersion 89235DE (35%) | 3.78 | 3.78 | 3.78 | 3.78 | 3.78 |
| MICHEM Dispersion 89640DE (40%) | 1.44 | 1.44 | 1.44 | 1.44 | 1.44 |
| Total | 100.00 | 100.00 | 100.00 | 100.00 | 100.00 |

TABLE 7

Floor Polish Application Results

| | Comp. H | Comp. C | Example 2 | Example 3 | Example 4 |
|---|---|---|---|---|---|
| Acid/Co-acid | MAA | MAA/IA | MAA | MAA | MAA |
| Chelant | None | None | GMA-IDA | GMA-IDA | GMA-IDA |
| $Ca^{2+}$ Level | 0.57 Eqv | 0.58 Eqv | 0.27 Eqv | 0.58 Eqv | 0.86 Eqv |
| Gloss-20: | | | | | |
| First Coat | 8 | 8 | 9 | 7 | 7 |
| Second Coat | 17 | 19 | 21 | 17 | 17 |
| Third Coat | 29 | 34 | 35 | 32 | 30 |
| Fourth Coat | 39 | 48 | 50 | 45 | 43 |
| Next day | 28 | 36 | 36 | 34 | 33 |
| Gloss-60: | | | | | |
| First Coat | 29 | 32 | 31 | 29 | 28 |
| Second Coat | 51 | 52 | 54 | 50 | 49 |
| Third Coat | 66 | 70 | 70 | 67 | 65 |
| Fourth Coat | 74 | 80 | 81 | 79 | 78 |
| Next day | 65 | 74 | 73 | 72 | 71 |
| Tack Time: | | | | | |
| First Coat | <15 | <15 | 15 | <15 | <15 |
| Second Coat | 20 | 18 | 21 | 21 | 18 |
| Third Coat | 19 | 16 | 21 | 20 | 16 |
| Fourth Coat | 19 | 18 | 27 | 17 | 17 |
| Avg Tack Time | 18 | 17 | 21 | 18 | 17 |
| Water Resistance | Wh | Hwh | Exc | TrWh | Wh |
| Detergent Resistance | 4 | 4 | 5 | 5 | 4 |
| Film Formation: | V. Good | Exc | Exc | Exc | Exc |
| Slip Resistance: | | | | | |
| S.C.O.F. | 0.66 | 0.61 | 0.61 | 0.57 | 0.56 |
| Soiling: | | | | | |
| Delta 'E' Value | 2.7 | 2.6 | 4.5 | 4.4 | 1.8 |
| Snell Capsule Test: | | | | | |
| BHM | Good | Good | Fair-Good | Good | Good |
| Dry Wipe off | Partial | Partial | No | Partial | Yes |
| Scuff Marks | V. Good | V. Good | V. Good | V. Good | V. Good |

TABLE 8

Floor Polish Formulation 2

|  | Duraplus ™ 3 | Comp. J | Example 7 | Example 8 | Example 11 | Example 12 |
|---|---|---|---|---|---|---|
| Acid/Co-acid |  | MAA | MAA | MAA | MAA | MAA |
| Chelant | None | IDA (Post Added) | AGE-IDA | AGE-IDA | GMA-IDA | GMA-IDA |
| $Ca^{2+}$ Level | Zinc Crosslinked | 0.86 Eqv | 0.58 Eqv | 0.86 Eqv | 0.61 Eqv | 0.85 Eqv |
| R. M. Order of Addition | Parts | Parts | Parts | Parts | Parts | Parts |
| Water | 44.51 | 43.64 | 43.19 | 42.31 | 41.51 | 44.51 |
| SE-21 (cut 50%) | 0.02 | 0.02 | 0.02 | 0.02 | 0.02 | 0.02 |
| Masurf FS-230 (1%) | 0.9 | 0.00 | 0.00 | 0.00 | 0.00 | 0.00 |
| Polyfox PF-156A | 0 | 0.40 | 0.40 | 0.40 | 0.40 | 0.40 |
| Chemguard 761P (1%) | 0 | 0.50 | 0.50 | 0.50 | 0.50 | 0.50 |
| Diethylene Glycol Ethyl Ether | 4.81 | 4.81 | 4.81 | 4.81 | 4.91 | 4.81 |
| Dipropylene Glycol n-Propyl Ether | 0.4 | 0.40 | 0.40 | 0.40 | 0.40 | 0.40 |
| 2,2,4-Trimethyl-1,3-Pentanediol Diisobutyrate | 0.89 | 0.89 | 0.89 | 0.89 | 0.89 | 0.89 |
| Tributoxy Ethyl Phosphate | 2.08 | 2.08 | 2.08 | 2.08 | 2.08 | 2.08 |
| Duraplus ™ 3 | 38.68 | 0.00 | 0.00 | 0.00 | 0.00 | 0.00 |
| Comp. J | 0 | 39.86 | 0.00 | 0.00 | 0.00 | 0.00 |
| Example 8 | 0 | 0.00 | 0.00 | 41.19 | 0.00 | 0.00 |
| Example 7 | 0 | 0.00 | 40.31 | 0.00 | 0.00 | 0.00 |
| Example 11 | 0 | 0.00 | 0.00 | 0.00 | 42.00 | 0.00 |
| Example 12 | 0 | 0.00 | 0.00 | 0.00 | 0.00 | 38.68 |
| Chemrez 30 (30%) | 1.19 | 1.19 | 1.19 | 1.19 | 1.19 | 1.19 |
| ME-89235 (35%) | 4.23 | 4.23 | 4.23 | 4.23 | 4.23 | 4.23 |
| ME-89640 (40%) | 1.98 | 1.98 | 1.98 | 1.98 | 1.98 | 1.98 |
| TOTALS: | 100 | 100.00 | 100.00 | 100.00 | 100.10 | 100.00 |

Duraplus ™ 3 polymer is a commercial zinc cross-linked control.

TABLE 9

Floor Polish Application Results 2

|  | Duraplus ™ 3 | Comparative J | Example 6 | Example 7 | Example 10 | Example 11 |
|---|---|---|---|---|---|---|
| Acid/Co-acid | MAA | MAA | MAA | MAA | MAA | MAA |
| Chelant | None | IDA (Post Added) | GMA-IDA | GMA-IDA | AGE-IDA | AGE-IDA |
| $Ca^{2+}$ Level | Zinc Crosslinked | 0.86 Eqv | 0.61 Eqv | 0.85 Eqv | 0.58 Eqv | 0.86 Eqv |
| 20° Gloss on BVCT |  |  |  |  |  |  |
| 1st ct | 4.5 | 3.9 | 4.4 | 4.6 | 4.1 | 4.6 |
| 2nd ct | 12.2 | 6.3 | 10.8 | 11.8 | 9.4 | 10.4 |
| 3rd ct | 23.9 | 13.4 | 21.6 | 22.8 | 19.9 | 18.0 |
| 4th ct | 37.1 | 23.2 | 33.9 | 35.2 | 31.7 | 21.0 |
| 5th ct | 50.3 | 34.5 | 42.4 | 41.0 | 41.8 | 19.8 |
| next day | 24.3 | 23.5 | 25.2 | 27.9 | 24.4 | 16.8 |
| 60° Gloss on BVCT |  |  |  |  |  |  |
| 1st ct | 20.8 | 17.7 | 20.5 | 20.5 | 19.9 | 21.0 |
| 2nd ct | 40.8 | 30.2 | 39.8 | 40.6 | 38.7 | 39.8 |
| 3rd ct | 60.2 | 47.5 | 58.8 | 59.5 | 58.2 | 54.3 |
| 4th ct | 73.4 | 61.8 | 72.2 | 72.2 | 71.3 | 60.9 |
| 5th ct | 83.0 | 71.8 | 78.4 | 76.6 | 76.6 | 60.8 |
| next day | 61.9 | 61.5 | 64.9 | 66.4 | 64 | 55.6 |
| Slip & Soil Resistance: |  |  |  |  |  |  |
| S.C.O.F. | 0.67 | 0.56 | 0.53 | 0.53 | 0.59 | 0.53 |
| Soil Resistance (Delta E) | 2.78 | 2.11 | 2.36 | 2.26 | 2.37 | 2.40 |
| Snell Capsule Test: |  |  |  |  |  |  |
| Black Heel mark Resistance | 6 | 7.5 | 8 | 8.5 | 7.5 | 9 |
| Scuff Mark Resistance | 5 | 8 | 8 | 8 | 8 | 9 |
| Scratch Ratings (1 → 10 Best) | 4 | 10 | 10 | 10 | — | — |

TABLE 10

Floor Polish Floor Wear Test for Removability

| Chelant<br>Ingredients Order of Addition | None<br>Parts | GMA-IDA<br>Parts |
|---|---|---|
| Water | 44.28 | 43.88 |
| DC-73 (neat) | 0.01 | 0.02 |
| Kathon CG (1.5%) | 0.00 | 0.00 |
| Chemguard S-761P (1%) | 0.00 | 0.96 |
| Zonyl FSJ (1%) | 0.84 | 0.00 |
| Rhoplex 1531C (37.94%) | 0.00 | 2.50 |
| Diethylene Glycol Ethyl Ether | 4.58 | 4.78 |
| Dipropylene Glycol n-Propyl Ether | 0.00 | 0.40 |
| 2,2,4-Trimethyl-1,3-Pentanediol Diisobutyrate | 1.18 | 0.95 |
| Tributoxy Ethyl Phosphate | 2.15 | 2.12 |
| Example 2 | 0.00 | 19.60 |
| Example 3 | 0.00 | 19.60 |
| Duraplus 3 | 40.04 | 0.00 |
| Chemrez 30 (30%) | 2.90 | 0.00 |
| ME-89235DE (35%) | 0.00 | 3.77 |
| ME-89640DE (40%) | 0.00 | 1.44 |
| A-C 540N (30%) | 4.02 | 0.00 |
| TOTAL: | 100.00 | 100.00 |
| Removability | Excellent | Excellent |

What is claimed is:

1. A floor polish composition comprising:
   (A) an aqueous solvent; and
   (B) a chelating polymer which comprises polymerized units derived from:
   (1) one or more aminocarboxylic acid compounds or their salts;
   (2) one or more polymerizable monomers comprising a vinyl group, an allyl group, or both, and optionally, an epoxy group; and
   (3) one or more ethylenically unsaturated monomers;
   wherein the polymerized units derived from (B)(1) one or more aminocarboxylic acid compounds or their salts comprise those having aminocarboxylic groups of at least one of the following structures:

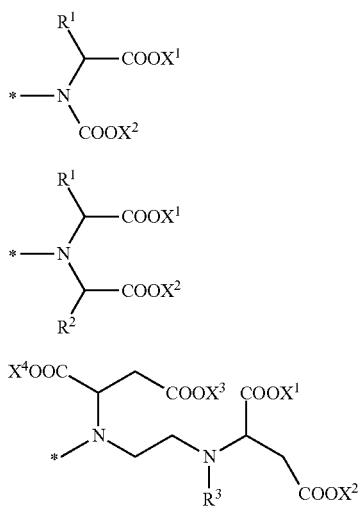

wherein $R^1$ and $R^2$ are each independently selected from the group consisting of a hydrogen, a $COOX^3$ and a $COOX^4$;

wherein $X^1$, $X^2$, $X^3$ and $X^4$ are each independently selected from the group consisting of a hydrogen, a monovalent cation and a polyvalent cation;

wherein the monovalent cation is selected from the group consisting of $Na^+$, $K^+$ and $NH_4^+$;

wherein the polyvalent cation is selected from the group consisting of $Ca^{2+}$ and $Mg^{2+}$;

wherein $R^3$ is hydrogen or a unit derived from a polymerizable monomer;

wherein * is the location at which the aminocarboxylic group is bound to the chelating polymer at a unit derived from a polymerizable monomer, or at a unit derived from an ethylenically unsaturated monomer;

wherein the floor polish composition contains a polyvalent cation concentration of 0.27 to 0.86 equivalents;

wherein the polymerized units derived from the B(3) one or more ethylenically unsaturated monomers, wherein the one or more ethylenically unsaturated monomers are selected from the group consisting of acrylic acid, methacrylic acid, alpha-ethacrylic acid, beta-dimethylacrylic acid, crotonic acid, acryloxypropionic acid, maleic acid, maleic anhydride, fumaric acid, itaconic acid, citraconic acid, mesaconic acid, methylenemalonic acid and alkali metal salts thereof;

and wherein the floor polish composition is zinc free.

2. The floor polish composition of claim 1, wherein the (B)(1) one or more aminocarboxylic acid compounds or their salts are selected from the group consisting of: iminodiacetic acid (IDA), iminodisuccinic acid (IDS), ethylenediamine triacetic acid (ED3A), ethylenediamine disuccinic acid (EDDS), and their salts.

3. The floor polish composition of claim 1, wherein the units derived from (B)(2) one or more polymerizable monomers comprising a vinyl group, an allyl group, or both, and, optionally, an epoxy group, have one or more of the following structures:

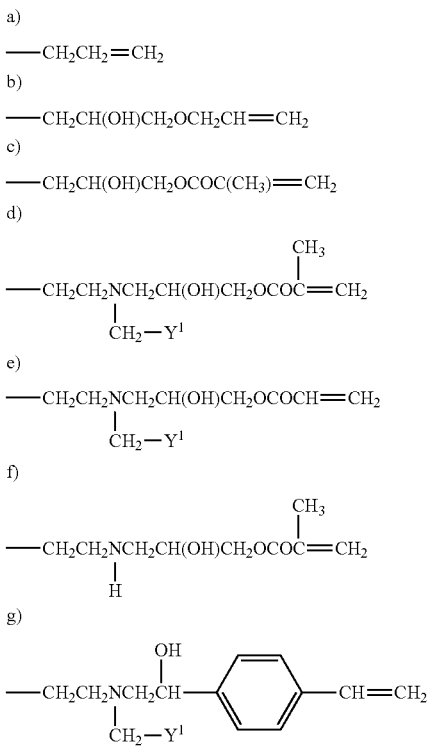

h) 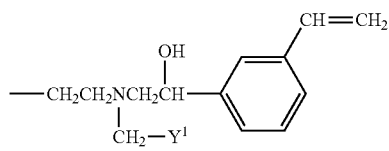

i) 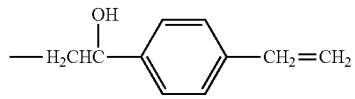

j) 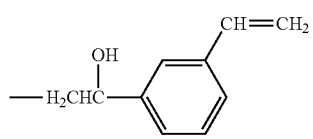

k) 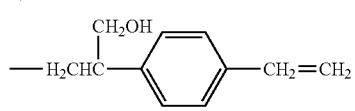

l) 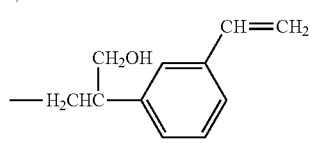

m) 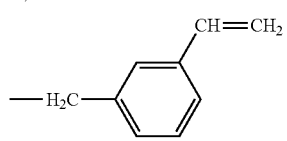

n) 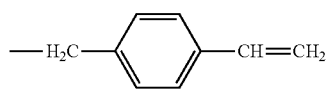

o) 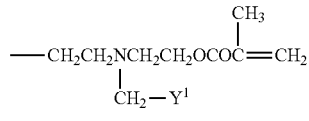

p) 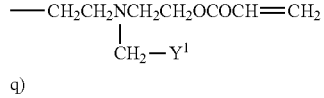

q) 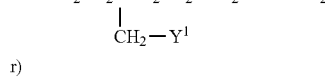

r) 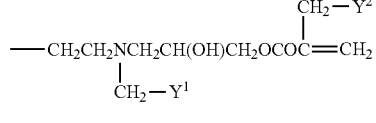

s) 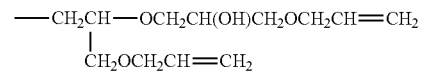

t) 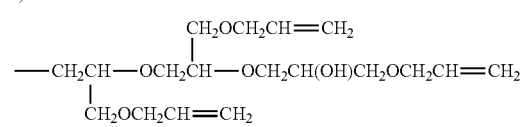

u) 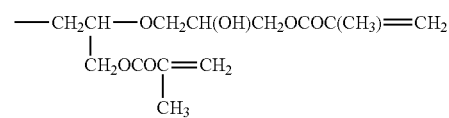

wherein $Y^1$ and $Y^2$ are each independently selected from the group consisting of a hydrogen, a $COOX^5$ and a $COOX^6$; wherein $X^5$ and $X^6$ are each independently selected from the group consisting of a hydrogen, a monovalent cation and a polyvalent cation; wherein the monovalent cation is selected from the group consisting of $N^+$, $K^+$ and $NH_4^+$; and wherein the polyvalent cation is selected from the group consisting of $Ca^{2+}$ and $Mg^{2+}$.

4. The floor polish composition of claim 3, wherein the (B)(2) one or more polymerizable monomers are selected from the group consisting of: glycidyl methacrylate (GMA), allyl glycidyl ether (AGE), vinylbenzyl chloride (IBC), allyl bromide, and their derivatives.

5. The floor polish composition of claim 1, comprising:
(A) from 1% to 95%, by weight, of the aqueous solvent, and
(B) from 5% to 80%, by weight, of the chelating polymer, based on the total weight of the floor polish composition.

6. The floor polish composition of claim 1, wherein the (B) chelating polymer further comprises units derived from:
(4) one or more crosslinking monomers.

7. The floor polish composition of claim 6, wherein the one or more crosslinking monomers is selected from the group consisting of: divinylaromatic compounds; di-, tri- and tetra-(meth)acrylate esters; di-, tri- and tetra-allyl ether compounds, tri- and tetra-allyl ester compounds, allyl (meth) acrylate, and combinations thereof.

8. A method for protecting a floor substrate having a surface which comprises applying the floor polish composition of claim 1 to the surface of the floor substrate; wherein the floor polish composition forms a sacrificial coating on the surface of the floor substrate.

9. The floor polish composition of claim 1, wherein the B (3) one or more ethylenically unsaturated monomers include methacrylic acid.

10. The method of claim 8, wherein the B (3) one or more ethylenically unsaturated monomers include methacrylic acid.

* * * * *